US012589627B2

(12) United States Patent　(10) Patent No.:　US 12,589,627 B2

Eichorst et al.　(45) Date of Patent:　Mar. 31, 2026

(54) STRUCTURE FOR MOVING WIRE FROM EXTERIOR TO INTERIOR OF A VEHICLE

(71) Applicant: Dometic Sweden AB, Solna (SE)

(72) Inventors: Daniel P. Eichorst, Elkhart (IN); Samuele Meda, Chichester (GB); Anton Lundqvist, Älvsjö (SE)

(73) Assignee: Dometic Sweden AB, Solna (SE)

( * ) Notice: Subject to any disclaimer, the term of this patent is extended or adjusted under 35 U.S.C. 154(b) by 246 days.

(21) Appl. No.: 18/449,294

(22) Filed: Aug. 14, 2023

(65) Prior Publication Data

US 2023/0398830 A1　Dec. 14, 2023

Related U.S. Application Data

(63) Continuation-in-part of application No. 17/003,310, filed on Aug. 26, 2020, now Pat. No. 11,752,827.

(51) Int. Cl.
B60H 1/00　(2006.01)

(52) U.S. Cl.
CPC ..... B60H 1/00207 (2013.01); B60H 1/00364 (2013.01); B60H 1/00428 (2013.01); B60H 1/00521 (2013.01); B60H 1/00535 (2013.01); B60H 2001/00235 (2013.01)

(58) Field of Classification Search
CPC ........... B60H 1/00207; B60H 1/00364; B60H 1/00428; B60H 1/00521; B60H 1/00535; B60H 2001/00235
See application file for complete search history.

(56) References Cited

U.S. PATENT DOCUMENTS

| | | | |
|---|---|---|---|
| D226,381 S | 2/1973 | Harty, Jr. | |
| D249,703 S | 9/1978 | Zimmerman et al. | |
| 4,154,213 A | 5/1979 | Winters | |
| 4,217,764 A | 8/1980 | Armbruster | |
| 4,508,126 A | 4/1985 | Everard | |
| D284,025 S | 5/1986 | Armstrong | |
| 4,628,702 A | 12/1986 | Boxum | |
| 4,641,502 A | 2/1987 | Aldrich | |
| 4,672,818 A | 6/1987 | Roth | |
| 4,709,623 A | 12/1987 | Roth | |
| 4,719,954 A | 1/1988 | Curtis et al. | |
| 4,729,227 A | 3/1988 | Peden | |

(Continued)

FOREIGN PATENT DOCUMENTS

| | | |
|---|---|---|
| AU | 2004202967 | 3/2011 |
| AU | 2007200788 | 9/2011 |

(Continued)

OTHER PUBLICATIONS

10-Minute Tech, Trailer Life, Jul. 1996, pp. 69-70 dated Jul. 1, 1996.

(Continued)

*Primary Examiner* — Tsion Tumebo

(74) *Attorney, Agent, or Firm* — Dinsmore & Shohl LLP

(57) ABSTRACT

An air conditioner, vent or like mountable structure on the roof of a recreational vehicle, which allows for movement of wires from an alternate exterior appliance from the exterior to the interior of the recreational vehicle through the mountable structure. The structure has one or more connection ports located to allow for connection of external wires to move to the interior of the vehicle.

19 Claims, 23 Drawing Sheets

(56) References Cited

U.S. PATENT DOCUMENTS

| | | | |
|---|---|---|---|
| 4,770,223 A | 9/1988 | Ouellette | |
| D300,777 S | 4/1989 | Bales | |
| D306,341 S | 2/1990 | Bales | |
| 4,924,895 A | 5/1990 | Bailie | |
| 4,996,850 A | 3/1991 | Boxum et al. | |
| 5,002,111 A | 3/1991 | Boiteau | |
| D318,218 S | 7/1991 | Ouellette | |
| 5,309,972 A | 5/1994 | Thomas | |
| 5,423,506 A | 6/1995 | Spoon | |
| 5,531,641 A | 7/1996 | Aldrich | |
| D376,007 S | 11/1996 | Thomas | |
| 5,672,101 A | 9/1997 | Thomas | |
| 5,697,417 A | 12/1997 | Spoon | |
| D391,632 S | 3/1998 | Thomas | |
| 5,791,156 A * | 8/1998 | Strautman | B60H 1/00364 296/38 |
| 5,848,536 A | 12/1998 | Dodge | |
| 5,897,435 A | 4/1999 | Thomas et al. | |
| D424,184 S | 5/2000 | Chang-Kwon | |
| 6,101,829 A | 8/2000 | Robinson | |
| 6,134,909 A | 10/2000 | Lyu | |
| 6,149,513 A | 11/2000 | Lyu | |
| D435,639 S | 12/2000 | Slavonia et al. | |
| 6,161,609 A | 12/2000 | Ahn | |
| 6,196,914 B1 | 3/2001 | Lyu | |
| 6,213,197 B1 | 4/2001 | Ebbeson | |
| 6,263,689 B1 | 7/2001 | Dodge | |
| 6,302,780 B1 | 10/2001 | Ahn et al. | |
| 6,339,934 B1 | 1/2002 | Yoon et al. | |
| 6,357,249 B1 | 3/2002 | Robinson et al. | |
| 6,370,899 B1 | 4/2002 | Hobbs et al. | |
| 6,437,524 B1 | 8/2002 | Dimanstein | |
| D463,541 S | 9/2002 | Thomas | |
| 6,449,973 B2 | 9/2002 | Dodge | |
| 6,536,222 B1 | 3/2003 | Ahn et al. | |
| 6,571,572 B2 | 6/2003 | Hobbs et al. | |
| D495,041 S | 8/2004 | Thomas | |
| 6,857,953 B2 | 2/2005 | Malott | |
| 7,004,832 B2 | 2/2006 | Thomas | |
| 7,131,705 B1 | 11/2006 | Delvecchio et al. | |
| 7,140,192 B2 | 11/2006 | Allen | |
| 7,171,822 B2 | 2/2007 | Allen | |
| 7,184,254 B2 | 2/2007 | Dimanstein | |
| D538,413 S | 3/2007 | Lyu et al. | |
| 7,234,315 B2 | 6/2007 | Allen | |
| 7,237,397 B2 | 7/2007 | Allen | |
| 7,316,119 B2 | 1/2008 | Allen | |
| 7,419,368 B2 | 9/2008 | Milks | |
| D588,479 S | 3/2009 | Giese | |
| 7,739,882 B2 | 6/2010 | Evans | |
| D629,094 S | 12/2010 | Thomas | |
| 7,931,323 B1 | 4/2011 | Del Vecchio | |
| 7,963,117 B2 | 6/2011 | Allen | |
| 8,019,478 B2 | 9/2011 | Whitehurst et al. | |
| 8,056,351 B2 | 11/2011 | Marciano | |
| D661,386 S | 6/2012 | Bergin | |
| 8,240,168 B2 | 8/2012 | Holguin | |
| D679,796 S | 4/2013 | Thomas | |
| 8,440,143 B2 | 5/2013 | Liptak | |
| 8,535,127 B2 | 9/2013 | Malott | |
| 8,568,209 B2 | 10/2013 | Boxum | |
| 8,744,632 B2 | 6/2014 | Blackshaw et al. | |
| D712,531 S | 9/2014 | Bergin | |
| D715,907 S | 10/2014 | Bergin | |
| D716,925 S | 11/2014 | Bergin | |
| 9,243,447 B2 | 1/2016 | Macdonald | |
| 9,540,873 B1 | 1/2017 | Townsley | |
| 9,631,832 B2 | 4/2017 | Malott | |
| D785,771 S | 5/2017 | Bergin | |
| D785,772 S | 5/2017 | Bergin | |
| 9,651,284 B2 | 5/2017 | Esch | |
| D795,712 S | 8/2017 | Bergin | |
| 9,725,949 B2 | 8/2017 | Townsley | |
| D811,566 S | 2/2018 | Liu | |
| D817,466 S | 5/2018 | Moseley | |
| 9,975,405 B2 | 5/2018 | Siddiqui | |
| D824,499 S | 7/2018 | Williamson | |
| 10,082,345 B1 | 9/2018 | Mihail | |
| 10,093,152 B2 | 10/2018 | Allard | |
| D841,138 S | 2/2019 | Williamson | |
| D850,609 S | 6/2019 | Bergin | |
| D862,668 S | 10/2019 | Moseley | |
| D865,926 S | 11/2019 | Moseley | |
| 10,502,445 B2 | 12/2019 | Matambo et al. | |
| 10,589,593 B2 | 3/2020 | Westendarp | |
| D884,870 S | 5/2020 | Bergin | |
| 10,675,941 B2 | 6/2020 | Williamson | |
| 10,696,129 B2 | 6/2020 | Bergin | |
| D905,217 S | 12/2020 | Hederstierna et al. | |
| D907,183 S | 1/2021 | Meda | |
| 10,941,955 B2 | 3/2021 | Heral | |
| D915,569 S | 4/2021 | Meda | |
| D917,036 S | 4/2021 | Hederstierna | |
| 11,034,208 B2 | 6/2021 | Williamson et al. | |
| D932,610 S | 10/2021 | Pozzi et al. | |
| 2002/0184909 A1 | 12/2002 | Hobbs et al. | |
| 2003/0218854 A1 | 11/2003 | Dimanstein | |
| 2004/0040325 A1 | 3/2004 | Evans | |
| 2005/0003751 A1 | 1/2005 | Thomas | |
| 2006/0052050 A1 | 3/2006 | Malott | |
| 2007/0227693 A1 | 10/2007 | Allen | |
| 2008/0202138 A1 | 8/2008 | Pabisz | |
| 2009/0209193 A1 | 8/2009 | Kloster | |
| 2010/0268397 A1 | 10/2010 | Whitehurst et al. | |
| 2013/0015173 A1 | 1/2013 | Robinson | |
| 2013/0153196 A1 | 6/2013 | Blackshaw et al. | |
| 2013/0205811 A1 | 8/2013 | Esch | |
| 2014/0096920 A1 | 4/2014 | Macdonald | |
| 2014/0158312 A1 | 6/2014 | Townsley | |
| 2014/0223928 A1 | 8/2014 | Esch | |
| 2014/0260393 A1 | 9/2014 | Siddiqui et al. | |
| 2015/0035437 A1 | 2/2015 | Panopoulos et al. | |
| 2015/0204600 A1 | 7/2015 | Fay et al. | |
| 2016/0176149 A1 | 6/2016 | Manderfeld et al. | |
| 2016/0200174 A1 | 7/2016 | Tremer et al. | |
| 2017/0043647 A1 * | 2/2017 | Vergamini | B60H 3/022 |
| 2017/0203632 A1 * | 7/2017 | Westendarp | B60H 1/00378 |
| 2017/0284906 A1 | 10/2017 | Xing et al. | |
| 2017/0335624 A1 | 11/2017 | Townsley | |
| 2018/0147913 A1 | 5/2018 | Bergin | |
| 2018/0265043 A1 | 9/2018 | Salter et al. | |
| 2018/0272959 A1 * | 9/2018 | Hornsby | G09F 21/042 |
| 2018/0335220 A1 | 11/2018 | Matambo et al. | |
| 2018/0370339 A1 | 12/2018 | Bacon | |
| 2019/0047353 A1 | 2/2019 | Williamson | |
| 2019/0047354 A1 | 2/2019 | Williamson | |
| 2019/0047380 A1 | 2/2019 | Snider | |
| 2019/0061829 A1 | 2/2019 | Fleckenstein et al. | |
| 2019/0128551 A1 | 5/2019 | Heral | |
| 2019/0315197 A1 | 10/2019 | Williamson | |
| 2020/0064008 A1 | 2/2020 | Matambo | |
| 2020/0148028 A1 | 5/2020 | Westendarp | |
| 2020/0198438 A1 | 6/2020 | Liu | |
| 2020/0298655 A1 | 9/2020 | Williamson | |
| 2020/0338951 A1 | 10/2020 | Paci | |
| 2021/0031593 A1 | 2/2021 | Kennedy | |
| 2021/0061054 A1 | 3/2021 | Meda | |
| 2021/0061058 A1 | 3/2021 | Meda | |
| 2021/0061060 A1 | 3/2021 | Meda | |
| 2021/0276396 A1 | 9/2021 | Jurek | |

FOREIGN PATENT DOCUMENTS

| | | |
|---|---|---|
| AU | 2007237183 | 12/2012 |
| AU | 2009233601 | 1/2013 |
| AU | 2007202766 | 11/2013 |
| AU | 354553 | 3/2014 |
| AU | 2012261549 | 8/2015 |
| AU | 367405 | 3/2016 |
| AU | 201612249 | 3/2016 |
| AU | 201613590 | 7/2016 |
| AU | 201613591 | 7/2016 |
| AU | 201613592 | 7/2016 |
| AU | 201613593 | 7/2016 |

(56) References Cited

FOREIGN PATENT DOCUMENTS

| | | |
|---|---|---|
| AU | 2016101949 | 12/2016 |
| AU | 2017100215 | 3/2017 |
| AU | 201712794 | 5/2017 |
| AU | 201712798 | 5/2017 |
| AU | 2017200186 | 8/2017 |
| AU | 201810968 | 3/2018 |
| AU | 201810969 | 3/2018 |
| AU | 201810970 | 3/2018 |
| AU | 201810971 | 3/2018 |
| AU | 201810972 | 3/2018 |
| AU | 201810973 | 3/2018 |
| AU | 201810975 | 3/2018 |
| AU | 201810977 | 3/2018 |
| AU | 201810978 | 3/2018 |
| AU | 201816419 | 1/2019 |
| AU | 201910037 | 2/2019 |
| AU | 201910038 | 2/2019 |
| AU | 201911094 | 4/2019 |
| AU | 201912125 | 6/2019 |
| AU | 2017364256 | 6/2019 |
| AU | 2019202512 | 10/2019 |
| AU | 201915241 | 12/2019 |
| AU | 201916406 | 12/2019 |
| AU | 201916408 | 12/2019 |
| AU | 201916409 | 12/2019 |
| AU | 2018366469 | 5/2020 |
| AU | 202016120 | 1/2021 |
| AU | 202016121 | 1/2021 |
| AU | 202016122 | 1/2021 |
| AU | 202016123 | 1/2021 |
| CA | 2518348 | 3/2006 |
| CA | 2578651 | 8/2007 |
| CA | 2587994 | 12/2007 |
| CA | 2611822 | 5/2008 |
| CA | 2686403 | 5/2010 |
| CA | 2906348 | 9/2014 |
| CA | 2951956 | 12/2015 |
| CA | 2954152 | 1/2016 |
| CA | 165232 S | 5/2016 |
| CA | 165233 S | 5/2016 |
| CA | 167431 S | 2/2017 |
| CA | 172872 S | 2/2017 |
| CA | 172873 S | 2/2017 |
| CA | 172874 S | 2/2017 |
| CA | 2967169 C | 8/2022 |
| CN | 103237671 A | 8/2013 |
| CN | 103687735 A | 3/2014 |
| CN | 204870448 U | 12/2015 |
| CN | 106059556 A | 10/2016 |
| CN | 106470856 A | 3/2017 |
| CN | 304097003 S | 4/2017 |
| CN | 106976376 A | 7/2017 |
| CN | 109070688 A | 12/2018 |
| CN | 305029216 S | 2/2019 |
| CN | 305029217 S | 2/2019 |
| CN | 305029218 S | 2/2019 |
| CN | 305105066 S | 4/2019 |
| CN | 110293813 A | 10/2019 |
| CN | 110385958 A | 10/2019 |
| CN | 305397384 S | 10/2019 |
| CN | 111344168 A | 6/2020 |
| CN | 213237518 | 5/2021 |
| CN | 213237945 | 5/2021 |
| DE | 9311066 U1 | 3/1994 |
| DE | 19654261 | 6/1998 |
| DE | 69503723 | 9/1998 |
| DE | 19730136 | 1/1999 |
| DE | 69817899 | 10/2003 |
| DE | 10255833 | 6/2004 |
| DE | 10336767 | 12/2004 |
| DE | 59812376 | 1/2005 |
| DE | 202004007924 | 11/2005 |
| DE | 202005013530 | 12/2005 |
| DE | 202004017266 | 4/2006 |
| DE | 202005000560 | 6/2006 |
| DE | 102005030362 | 11/2006 |
| DE | 602004004480 | 3/2007 |
| DE | 202006001374 | 7/2007 |
| DE | 202006001376 | 7/2007 |
| DE | 202006001377 | 7/2007 |
| DE | 202006009803 | 12/2007 |
| DE | 202007012195 U1 | 12/2007 |
| DE | 202007006292 | 10/2008 |
| DE | 102007038716 | 2/2009 |
| DE | 602005012194 | 2/2009 |
| DE | 202008003123 | 9/2009 |
| DE | 102008028066 | 12/2009 |
| DE | 602007009584 | 11/2010 |
| DE | 502007006725 | 4/2011 |
| DE | 202011051110 U1 | 10/2011 |
| DE | 202011101256 | 12/2011 |
| DE | 202010012578 | 2/2012 |
| DE | 202011002986 | 7/2014 |
| DE | 202013004158 | 9/2014 |
| DE | 102016220768 | 4/2018 |
| DE | 102017214863 A1 | 10/2018 |
| DE | 112017000915 | 10/2018 |
| DE | 102017214941 | 2/2019 |
| DE | 1020172214941 A1 | 2/2019 |
| DE | 102017207797 | 8/2019 |
| DE | 112017005541 | 8/2019 |
| DE | 102018204532 | 9/2019 |
| DE | 102018206490 | 10/2019 |
| DE | 102019205194 | 10/2019 |
| DE | 102017219353 | 11/2019 |
| DE | 102018206854 | 11/2019 |
| DE | 112018003284 | 3/2020 |
| DE | 202015009786 | 3/2020 |
| DE | 212018000248 | 3/2020 |
| DE | 212018000249 | 3/2020 |
| DE | 112018003288 | 4/2020 |
| DE | 102018222877 | 6/2020 |
| DE | 102018222877 A1 | 6/2020 |
| DE | 112018005002 | 7/2020 |
| DE | 112018005883 | 7/2020 |
| EP | 700801 | 3/1996 |
| EP | 869018 | 10/1998 |
| EP | 892225 | 1/1999 |
| EP | 1538009 | 6/2005 |
| EP | 1634740 | 3/2006 |
| EP | 1721765 | 11/2006 |
| EP | 1752717 | 2/2007 |
| EP | 1826041 | 8/2007 |
| EP | 1870270 | 12/2007 |
| EP | 1925889 | 5/2008 |
| EP | 1955946 | 8/2008 |
| EP | 1988612 | 11/2008 |
| EP | 2189312 | 5/2010 |
| EP | 2192040 | 6/2010 |
| EP | 2196390 | 6/2010 |
| EP | 2433658 | 3/2012 |
| EP | 2665611 | 10/2014 |
| EP | 2178710 | 11/2015 |
| EP | 2616258 | 2/2016 |
| EP | 3113965 | 1/2017 |
| EP | 3241695 | 4/2018 |
| EP | 2714440 | 5/2018 |
| EP | 2994326 | 7/2018 |
| EP | 3401619 | 11/2018 |
| EP | 3411250 | 12/2018 |
| EP | 3476630 | 5/2019 |
| EP | 3543047 | 9/2019 |
| EP | 3564564 | 11/2019 |
| JP | 2008290694 A | 12/2008 |
| KR | 1020130142766 A | 12/2013 |
| KR | 102098632 B1 | 4/2020 |
| WO | 2009021994 A1 | 2/2009 |
| WO | 2012034695 A1 | 3/2012 |
| WO | 2012113538 A1 | 8/2012 |
| WO | 2012159749 A1 | 11/2012 |
| WO | 2014143181 A1 | 9/2014 |
| WO | 2014180559 A1 | 11/2014 |
| WO | 2015131235 A1 | 9/2015 |
| WO | 2017143393 A1 | 8/2017 |

(56) References Cited

FOREIGN PATENT DOCUMENTS

| | | |
|---|---|---|
| WO | 2017143394 A1 | 8/2017 |
| WO | 2018096127 A1 | 5/2018 |
| WO | 2019038023 A1 | 2/2019 |
| WO | 2019082168 A1 | 5/2019 |
| WO | 2019097448 A1 | 5/2019 |
| WO | 2019207451 A2 | 10/2019 |
| WO | 2019229706 A1 | 12/2019 |
| WO | 2019244011 A1 | 12/2019 |
| WO | 2020143636 A1 | 7/2020 |
| WO | 2020151541 A1 | 7/2020 |
| WO | 2020188485 A2 | 9/2020 |
| WO | 2020192746 A1 | 10/2020 |
| WO | 2021074841 | 4/2021 |
| WO | 2021228620 A1 | 11/2021 |

OTHER PUBLICATIONS

American RV Company, Dometic 459530 Duo Therm 13,500 BTU Brisk Air Conditioner High Efficiency Upper Unit Trailer Camper RV, Mar. 23, 2014, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.

American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.

American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.

American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.

American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.

Dirna Bergstrom: Slim Cool; http://www.dirna.com/files/dirna-manuals/220RE00183.pdf May 21, 2014.

Dometic Corporation, Dometic High Performance Air Conditioners, 2 pages, Jan. 1, 2011.

Dometic Duo-Therm, p. 140, Feb. 23, 2013.

Dometic Group: "Climate Control", http://www.dometic.com/enus/Americas/USA/RV-Products/climate, 2 pages.

Dometic Waeco Coolair RT 880; http://vwww.dometic.co.uk/product/waeco-coolair-rt-880-2/ May 14, 2015.

Eberspacher Cooltronic Parking Coolers with High Efficiency with the Engine OFF; http://www.eberspacher.com/products/air-conditioning/cooltronic-truck-parking-coolers.html Jun. 23, 2015.

Indelb; WO Oblo; Sleeping Well Oblo; http://www.indelb.com/products/parking_air_cooler/sleeping_well/sw_oblo Apr. 1, 2016.

Webasto: Rooftop air conditioning systems: Rooftop 3.5-9.9 kw; https://web.archive.org/web/20161201014045/ https://www.webasto.com/au/markets-products/off-highway/air-conditioning/rooftop-air-conditioning/rooftop-ac-35-99-kw/.

Webasto; Truck parking cooler: Cool Top Vario 10 E; http://www.webasto.com/GB/marketsproducts/truck/air-conditioning/products/cool-top-vario/ Apr. 25, 2016.

YOUTUBE; Viesa Kompressor; https://www.youtube.com/watch?v=SPK17XEvVLO May 22, 2012 (https://www.google.com/?gws_rd=ssl#q=https://www.youtube.com/watch?v%3DSPK17XEvVL0&spf=1495819902591).

Dirna Bergstrom: Parking Coolers—No-Idle Electrical A/C—MiniCool Compact 1.4; http://www.dirna.com/parking-coolers-no-idle-electrical-ac-compact/ Mar. 17, 2015.

Design U.S. Appl. No. 29/760,605, filed Dec. 2, 2020.

U.S. Appl. No. 17/252,506, filed Dec. 15, 2020.

U.S. Appl. No. 63/141,800, filed Jan. 26, 2021.

Design U.S. Appl. No. 29/767,929, filed Jan. 26, 2021.

Design U.S. Appl. No. 29/774,535, filed Mar. 17, 2021.

U.S. Appl. No. 17/205,719, filed Mar. 18, 2021.

U.S. Appl. No. 63/175,304, filed Apr. 1, 2021.

DE Patent Application No. 10201921949.8 Filed on Aug. 28, 2019 entitled "Mini Heki Upgrade Kit".

DE Patent Application No. 102019212946.3 Filed on Aug. 28, 2019 entitled "Modular Sensors—Mini Heki Upgrade Kit".

DE Patent Application No. 102019212947.1 Filed on Aug. 28, 2019 entitled "Connection Hub—Mini Heki Upgrade Kit".

DE Office Action Issued in Patent Application No. 102019212946.3 Mailed on Nov. 11, 2019.

DE Office Action Issued in Patent Application No. 102019212947.1 Mailed on Nov. 11, 2019.

DE Office Action Issued in Patent Application No. 102019212947.1 Mailed on Jun. 17, 2020.

Examination Report Issued in DE Patent Application No. 102019212946.3 mailed on Apr. 9, 2021.

Office Action Issued in DE Patent Application No. 10201921949.8 mailed on Apr. 19, 2021.

Non-Final Office Action issued in U.S. Appl. No. 17/003,309 mailed on Aug. 23, 2022.

Restriction Requirement issued in U.S. Appl. No. 17/003,317 mailed on Sep. 23, 2022.

Office Action issued in DE Patent Application No. 102019212946.3 mailed on Aug. 10, 2022.

Office Action issued in DE Patent Application No. 102019212947.1 mailed on Nov. 17, 2022.

Decision of Grant issued in DE Patent Application No. 102019212946.3 mailed on Dec. 19, 2022.

Decision of Grant issued in DE Patent Application No. 102019212949.8 mailed on Jan. 16, 2023.

Non-Final Office Action issued in U.S. Appl. No. 17/003,309 mailed on Mar. 14, 2023.

"LASCO 15-1623 PVC Hose Adapter with 3/4-Inch Female Hose and 3/4-Inch PVC Pipe Glue Connection, White", 8 pages, Mar. 4, 2014, Available Online at:https://www.amazon.com/LASCO-15-1623-Adapter-4-Inch-Connection/dp/B00ITPIG54.

Oliver, Bill, "How to Install a Window AC Unit in a Travel Trailer.", Jun. 25, 2019, Available Online at: https://www.youtube.com/watch?v=4inORCVktaE. (Year: 2019).

Non-Final Office Action issued in U.S. Appl. No. 17/003,317 mailed on Mar. 21, 2023.

Patent Certificate issued in DE Patent Application No. 102019212946.3 mailed on Mar. 30, 2023.

Patent Certificate issued in DE Patent Application No. 102019212949.8 mailed on Apr. 27, 2023.

Final Office Action issued in U.S. Appl. No. 17/003,317 mailed on Oct. 27, 2023.

Final Office Action issued in U.S. Appl. No. 17/003,309 mailed on Dec. 1, 2023.

Ex-Parte Quayle Action issued in U.S. Appl. No. 17/003,310 mailed on Dec. 23, 2022.

Notice of Allowance issued in U.S. Appl. No. 17/003,310 mailed on May 2, 2023.

Corrected Notice of Allowability issued in U.S. Appl. No. 17/003,310 mailed on Jul. 19, 2023.

PCT Application No. PCT/IB2024/057864 titled "Structure Which Moves Wire From Exterior To Interior of a Vehicle" filed on Aug. 13, 2024.

Decision of Grant issued in DE Patent Application No. 102019212947.1 mailed on Oct. 14, 2024.

(56) References Cited

OTHER PUBLICATIONS

Non-Final Office Action issued in U.S. Appl. No. 17/003,317 mailed on Jun. 3, 2024.
Non-Final Office Action issued in U.S. Appl. No. 17/003,309 mailed on Jun. 28, 2024.
Design U.S. Appl. No. 29/951,603 titled "Fan Housing and Cover" filed on Jul. 10, 2024.
International Search Report and Written Opinion issued in PCT Patent Application No. PCT/IB2024/057864 mailed on Jan. 28, 2025.
U.S. Appl. No. 16/384,376, filed Apr. 15, 2019 titled Air Distribution Apparatus.
U.S. Appl. No. 17/003,309, filed Aug. 26, 2020 titled Component of Climatization System or Window System.
U.S. Appl. No. 17/003,310, filed Aug. 26, 2020 titled Air Conditioning Unit.
U.S. Appl. No. 17/003,317, filed Aug. 26, 2020 titled Climatization and Window System for Mobile Homes.
U.S. Appl. No. 17/049,731, filed Oct. 22, 2020 titled Damped Mobile Compressor.
Design U.S. Appl. No. 29/594,476, filed Feb. 17, 2017 titled Shroud Assembly.
Design U.S. Appl. No. 29/604,433, filed May 17, 2017 titled Air Conditioning Apparatus.
Design U.S. Appl. No. 29/645,887, filed Apr. 30, 2018 titled Mobile Air Conditioner.
Design U.S. Appl. No. 29/660,094, filed Aug. 17, 2018 titled Air Distribution Box.
Design U.S. Appl. No. 29/715,592, filed Dec. 3, 2019 titled Filter Housing.
Design U.S. Appl. No. 29/758,314, filed Nov. 13, 2020 titled Air Conditioning Apparatus.
Dometic Product Catalog—Climate Control. 2015.
Dometic Product Catalog—Climate Control. 2016.
AU Patent Application No. 2024324342 titled "Structure Which Moves at Least One Wire Between an Exterior and an Interior of a Vehicle" filed on Dec. 18, 2025.
CN Patent Application No. 202480044407.6 titled "Structure Which Moves at Least One Wire Between an Exterior and an Interior of a Vehicle" filed on Dec. 30, 2025.

* cited by examiner

S2

S3

STRUCTURE FOR MOVING WIRE FROM EXTERIOR TO INTERIOR OF A VEHICLE

CLAIM TO PRIORITY

This continuation-in-part patent application claims priority to and benefit of, under 35 U.S.C. § 120, U.S. patent application Ser. No. 17/003,310, filed Aug. 26, 2020 which claims priority to German Patent Application Serial Number DE 102019212947.1, filed Aug. 28, 2019, all of which is incorporated by reference herein.

BACKGROUND

The present embodiments relate to a structure which allows for movement of wire from an exterior to an interior of a recreational vehicle.

In recreational vehicles like mobile homes, air conditioning units are widely used and are typically mounted on the roof of the recreational vehicle.

Especially mobile homes are often further equipped with a variety of devices that either make life comfortable, like a satellite antenna, lamps and the like and/or help to optimize energy consumption of the mobile home, like solar panels and the like. The plurality of different external devices, however, increases complexity of the overall system because of the increasing number of cables and control interfaces that are often necessary for each of those external devices.

The present embodiments address this problem and aims to provide a solution to this problem. As such, the present embodiments provide an air conditioning unit mountable on the roof of a recreational vehicle, the air conditioning unit has an outer cover, a gasket and means for providing at least one air flow path. The gasket and the means for providing at least one air flow path are located on the bottom side of the air conditioning unit. The bottom side, in a mounted state, faces the roof. The gasket is configured to provide for a sealing with the outer roof surface of the recreational vehicle and the gasket is circumferential and encloses an area through which the air flow path passes.

SUMMARY

According to the present embodiments, the air conditioning unit has one or more connection ports located at a portion on or underneath the outer cover, the one or more connection ports are accessible by the user, in the mounted state, from outside the recreational vehicle. It is particularly preferred that the one or more connection ports are located at a portion on the outer cover, so that the connection ports are easily accessible from the outside, in order to plug-in a plug to the connections port quickly. In case one or more of the connection ports are located underneath the outer cover of the air conditioning unit, access to the connection ports is provided via a lid at the outer cover.

In view of the above posed problem, the air conditioning unit serves as a connection hub for external devices, thereby drastically decreasing complexity within the system of the recreational vehicle.

According to some embodiments, the one or more connection ports are located on a side and/or at the back of the air conditioning unit, with respect to the mounted state. As such, the connection ports are easily to reach from the outside.

According to some embodiments, each of the one or more connection ports enables electric and/or electronic connection to a device for either providing electric energy to the device and/or transferring data between the device and the air conditioning unit. This provides the possibility of connection a variety of different external devices to the air conditioning unit.

According to some embodiments, the air conditioning unit is configured so that the electronic connection enables control of the device via the air conditioning unit. This saves at least one additional component.

According to some embodiments, the air conditioning unit is configured so that the control of the device can be performed from inside the recreational vehicle via an interface. This increases the comfort for the user. For example, only one interface is necessary that controls the air conditioning unit and all the connected devices.

According to some embodiments, the air conditioning unit includes means for establishing a wireless connection to the interface. This increases flexibility.

According to some embodiments, the one or more connection ports comprise a socket for providing direct current. Thereby, the external device can simply be plugged in the air conditioning unit or air conditioner and there is no need for putting an extension cable at the roof.

According to some embodiments, the one or more connection ports comprise an inverter and a socket for providing alternating current. This saves one additional component.

According to some embodiments, the one or more connection ports comprise a plug for plugging the air conditioning unit or air conditioner to an external source of electricity. Thus, if an external source of energy is available, power from the recreational vehicle can be saved.

According to some embodiments, the one or more connection ports comprise a solar panel connection port. The solar panel can be plugged into the air conditioning unit or air conditioner which in turn supplies the energy to the recreational vehicle without further equipment or components.

According to some embodiments, the one or more connection ports comprise an antenna connection port. Thus, it is possible to watch TV and to control the air condition with only one control interface. Further, the air conditioning unit or air conditioner further includes an antenna connected to the antenna connection port and that both the antenna and the antenna connection port are located underneath the outer cover. The antenna can be connected with a receiver located inside the vehicle or somewhere else.

According to some embodiments, the one or more connection ports comprise a camera connection port, for example, for a surveillance camera. The camera just has to be plugged in the air conditioning unit or air conditioner without the need for any further equipment or components.

According to some embodiments, the one or more connection ports comprise an external light connection port. Plugging in and controlling an outside light is thereby simplified.

According to some embodiments, a structure is configured to move wire between an exterior and an interior and comprises a gasket configured to seal an outer surface of a recreational vehicle wherein the gasket is configured to enclose an opening in the outer surface through which the at least one air flow path passes. A frame is configured to be placed on the gasket and on a surface of the recreational vehicle, the frame surrounds the opening in the outer surface of the vehicle, the opening defines a flow path. The frame comprises a flange and one or more outwardly extending walls extending from the flange. One or more apertures disposed in the outwardly extending walls of the frame, the one or more ports defining a wire pathway through the frame, the wire pathway configured to extend between the exterior and the interior of the vehicle. One or more connectors disposed in the one or more ports, respectively.

According to some embodiments, the structure may be a roof top air conditioner.

According to some embodiments, the roof top air conditioner having a housing, with a plurality of cooling mechanicals therein, the housing defining the frame.

According to some embodiments, the housing having a base and cover, with a plurality of cooling mechanicals therein, the base and cover defining the frame.

According to some embodiments the structure may further comprise a plurality of connection ports on the housing of the air conditioning unit.

According to some embodiments, the plurality of connection ports extending from a ventilation slots.

According to some embodiments, the structure being a roof vent.

According to some embodiments, the roof vent having a vent cover disposed over the frame.

According to some embodiments, the structure may further comprise one or more connectors extending from the outwardly extending wall of the frame.

According to some embodiments, the structure further comprising an aperture plate extending from the outwardly extending wall comprising the one or more ports.

According to some embodiments, the aperture plate having a thickness that is greater than the one or more outwardly extending walls.

According to some embodiments, the structure further comprising one or more connectors extending through the aperture plate and into the one or more outwardly extending walls.

According to some embodiments the connectors may be MC4 connectors.

According to some embodiments, a system for providing electrical communication from exterior to interior of a vehicle, comprises an appliance configured to be positioned on the exterior of the vehicle, a frame configured to be positioned exterior of the vehicle, the frame capable of being positioned over an opening in an exterior surface of the vehicle. One or more wires or cables extending between the appliance and frame. A port disposed in the frame and a connector located in the port, the connector providing a connection for the one or more wires or cables and one or more interior wires or cables. The one or more interior wires or cables extending to a location within the vehicle.

According to some embodiments, the appliance may comprise a solar panel, external light, antenna, camera, inverter, or sensor.

According to some embodiments, the frame may be a portion of structure defining a ventilation fan, a refrigerator roof vent, or an air conditioner unit.

According to some embodiments, the frame may have one or more walls.

According to some embodiments, the system may further comprise an aperture plate formed in the one or more walls.

BRIEF DESCRIPTION OF THE DRAWINGS

In the following, various embodiments will be further illustrated while referring to the attached figures, in which.

DETAILED DESCRIPTION

Figure 1:
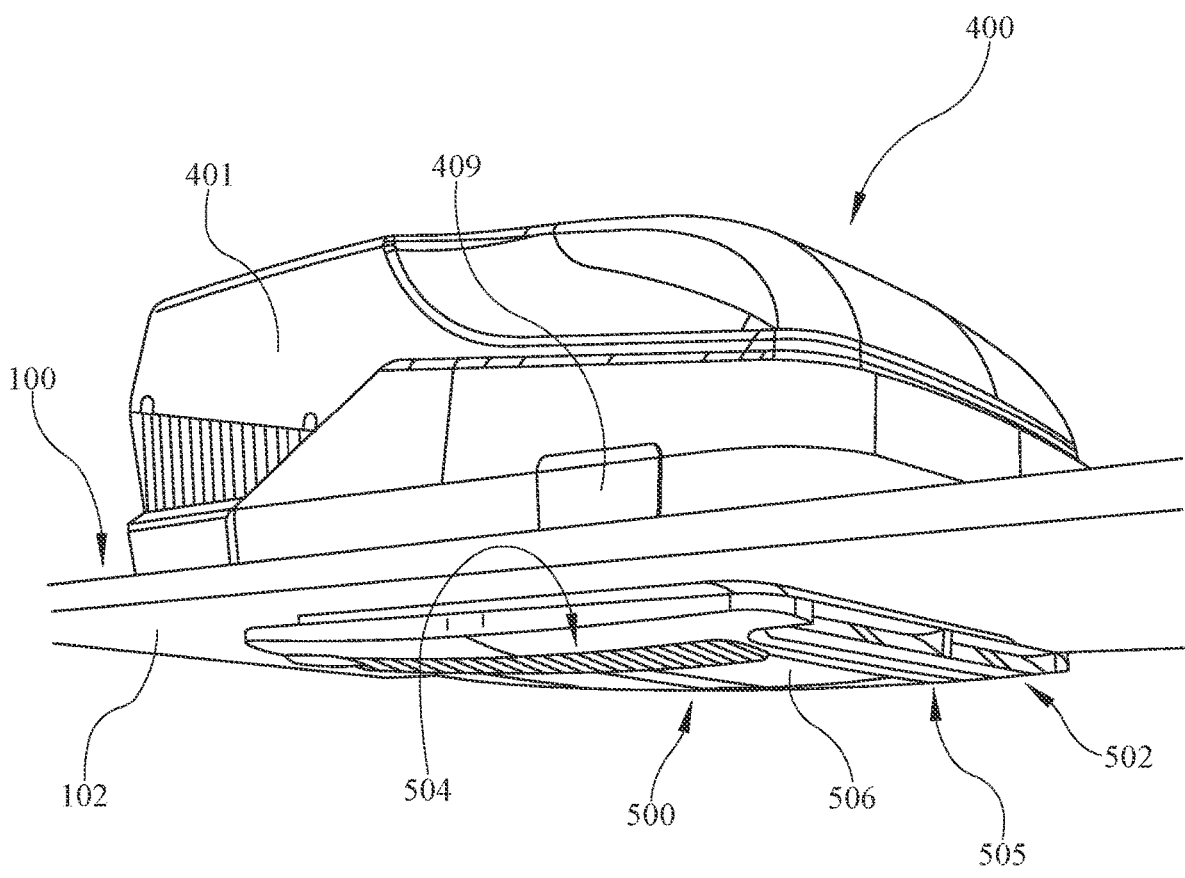
FIG. 1 illustrates a perspective view from obliquely below of an assembled modular climatization system according to an embodiment.

In FIG. 1, a mounted version of the modular climatization system is shown with both the air conditioning unit or air conditioner 400 and the air distribution unit 500 being mounted. The air conditioning unit or air conditioner 400 is mounted outside the recreational vehicle, i.e. at the roof 100 of the recreational vehicle. The air conditioning unit or air conditioner 400 has a rigid outer cover 401 that protects the inside from environmental influences. The outer cover 401 has an aerodynamic shape. Further at the outside of the air conditioning unit or air conditioner 400 a cover covering one or more connection ports 409 are shown by which it is possible to connect external devices and/or to connect the air conditioning unit or air conditioner 400 to an external source of energy.

The roof 100 is illustrated as a flat board. However, typical shapes of roofs 100 of recreational vehicles are also compatible with the modular climatization system. Below the roof 100 at the ceiling 103, the air distribution unit 500 is mounted. Conditioned air is released at the air outlet 505 provided with air deflecting elements 502 at a side of the air distribution unit 500. The air distribution unit 500 is rather flat shaped in order to occupy less space inside the recreational vehicle. The conditioned air is released substantially horizontally along the ceiling 103 which is controlled by the air deflecting elements 502.

In a region near in the center of the air distribution unit 500, air inside the recreational vehicle is sucked in via the air inlet 504. At the air inlet 504, a filter cover 506 is provided that prevents dust or other particles from entering the air conditioning unit or air conditioner 400. The inside air is sucked substantially vertically upwards in order to prevent that the released conditioned air immediately re-enters the air conditioning unit or air conditioner 400.

Figure 2:
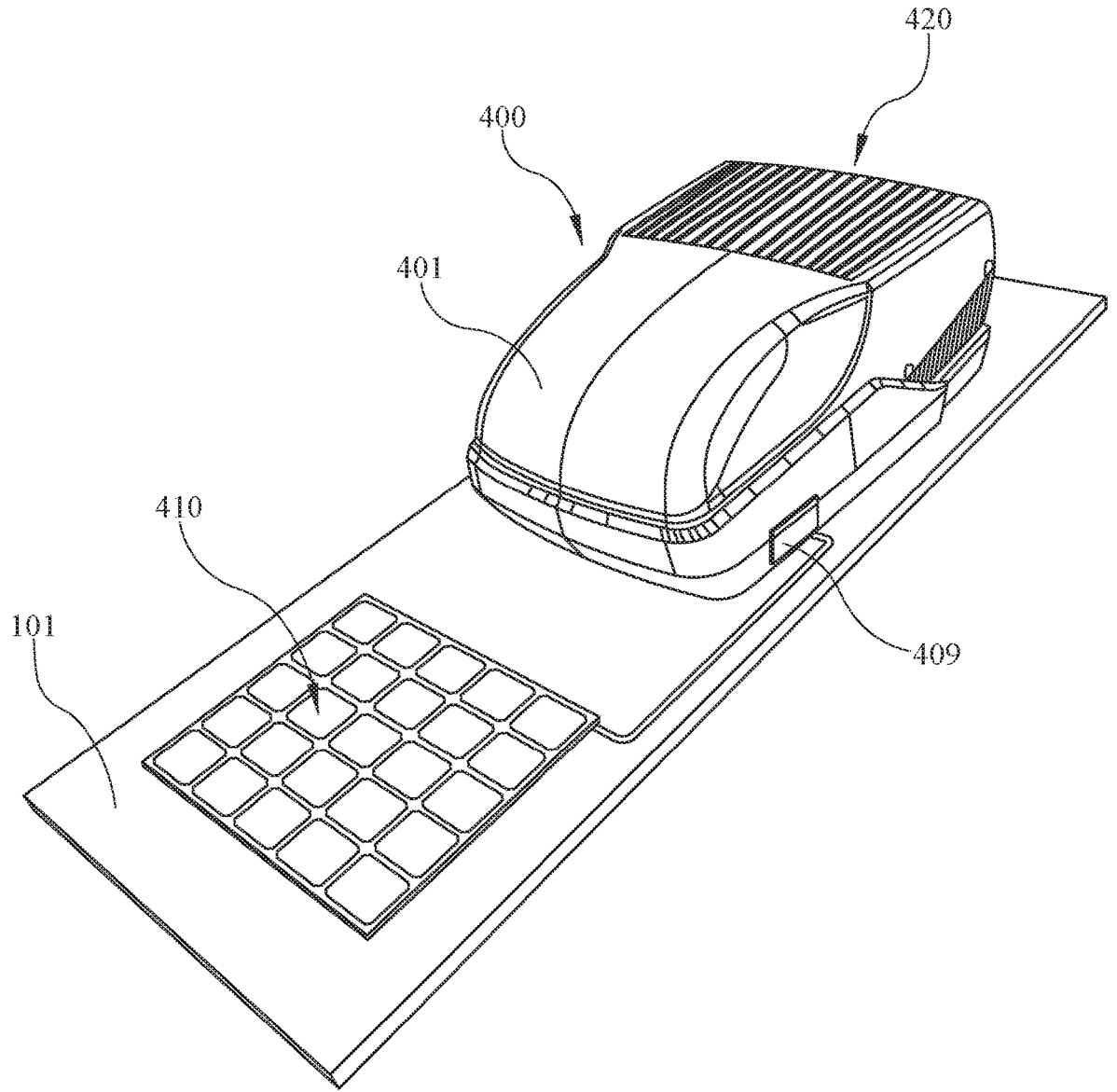
FIG. 2 illustrates a perspective view from obliquely above of the assembled modular climatization system of FIG. 1 with a solar panel.

In FIG. 2, the mounted modular climatization system of FIG. 1 is shown from above. The air conditioning unit or air conditioner 400 comprises a plurality of air vents 420 that provide for an effective heat exchange. As one possible external device that can be connected to the connection port 409, a solar panel 410 is exemplarily shown. The solar panel 410 is fixed at the outer roof surface 101 in front of the air conditioning unit or air conditioner 400 in the driving direction.

Figure 3:
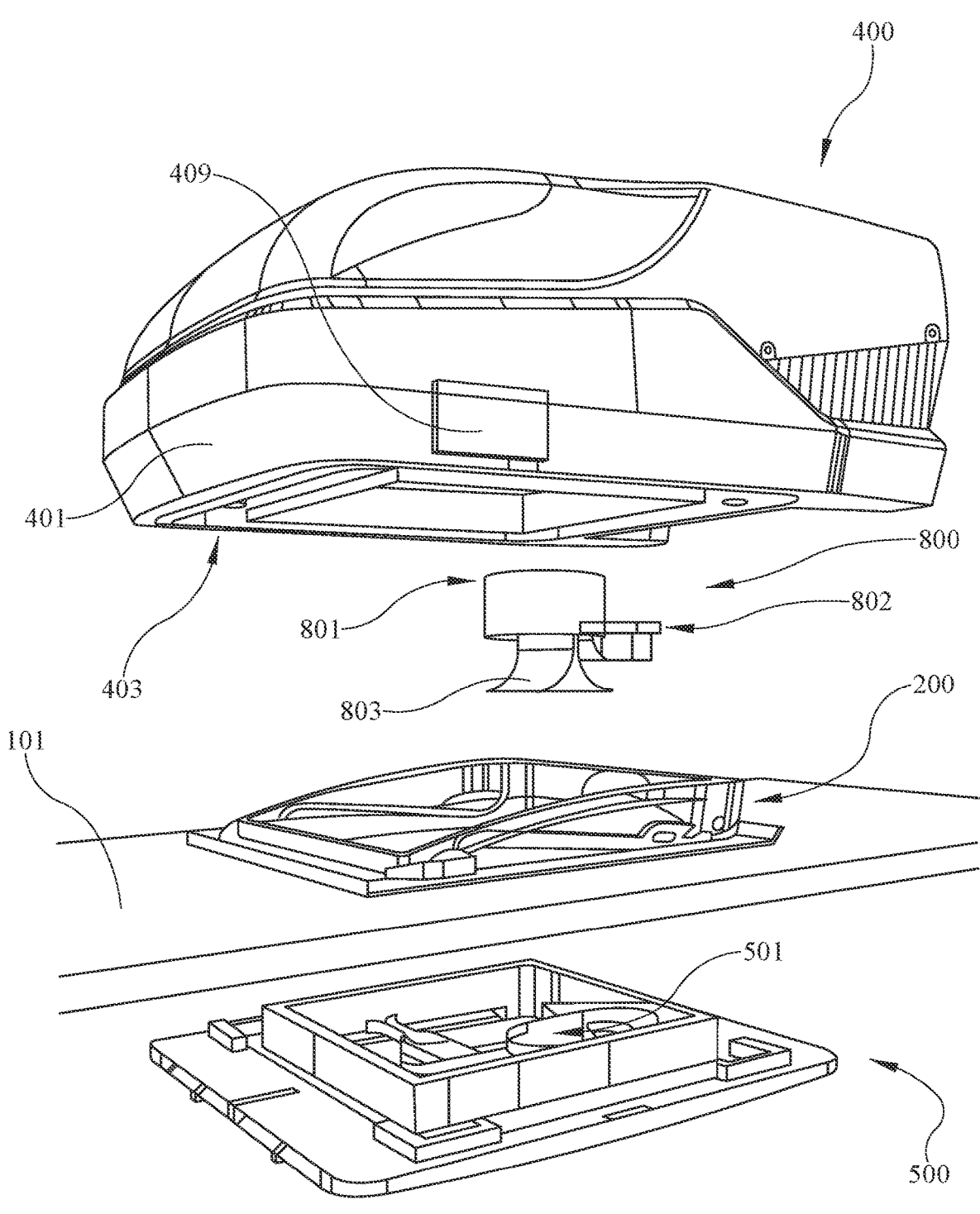
FIG. 3 illustrates an exploded view of the modular climatization system of FIG. 1.
Figure 4:
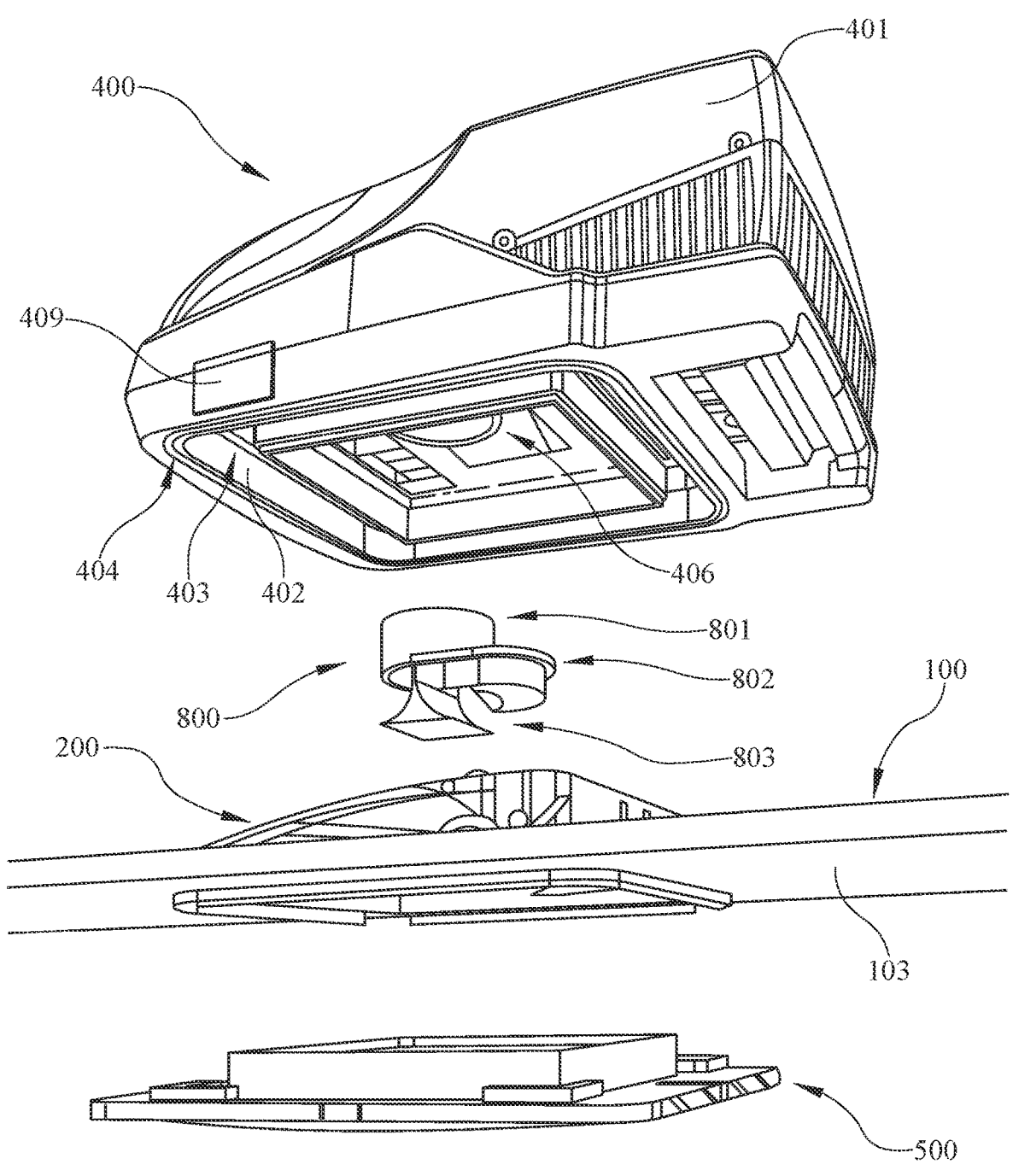
FIG. 4 illustrates another exploded view of the modular climatization system of FIG. 1.

FIGS. 3 and 4 both show an exploded view of the modular climatization system of FIGS. 1 and 2. At the underside of the air conditioning unit or air conditioner 400, the gasket 404 surrounds the area of the opening of the roof 100. The gasket in this embodiment is of a flexible sealing material that is placed within a groove 419. Furthermore, the circumferential or peripheral cavity 403 lies concentrically with the gasket 404 at the underside of the air conditioning unit or air conditioner 400. In the cavity 403, space is provided for accommodating the mounting frame 200, particularly the upper component 206 of the mounting frame 200, which will be explained further below. The cavity 403 includes abutting portions that abut against the mounting frame 200 in order to secure the air conditioning unit or air conditioner 400 from lateral movement, i.e. in a direction in the plane defined by the opening 201 of the mounting frame 200.

Further, in the area enclosed by the cavity 403, the first pipe section 406 of the air conditioning unit or air conditioner 400 protrudes vertically downwards and provides an air flow path for the released conditioned air into the inside of the recreational vehicle.

The further component in the direction of the air flow path downwards is the adapter 800. The adapter 800 has on its upper side the third pipe section 801 which fits with the first pipe section 406 of the air conditioning unit or air conditioner 400. Further below, the adapter 800 has the fourth pipe section 802 and the air stream divider 803. Independent from the actual design of the adapter 800, in this embodiment, the adapter 800 is made as a one-piece plastic component. This has the advantage that air cannot leak. Due to manufacturing aspects, however, it may also be valuable on a case-by-case basis that the adapter 800 is composed of several pieces.

The adapter 800 is further connected via its fourth pipe section 802 with the air distribution unit 500, thereby completing the air flow path to the inside of the recreational vehicle. In the present embodiment, the second pipe section 501 of the air distribution unit 500 is not of such a circular shape the first pipe section 406 is. Therefore, the adapter 800 is rather asymmetrically shaped. In a mounted state, the fourth pipe section 802 engages with the second pipe section 501 and the air stream divider 803 immerses into the air distribution unit 500.

The air distribution unit 500 and the mounting frame 200 are designed in a way that, analogously to the air conditioning unit or air conditioner 400, the air distribution unit 500 can be sort of plugged onto the mounting frame 200 thereby preventing the air distribution unit 500 from lateral movement with respect to the mounting frame 200.

Figure 5:
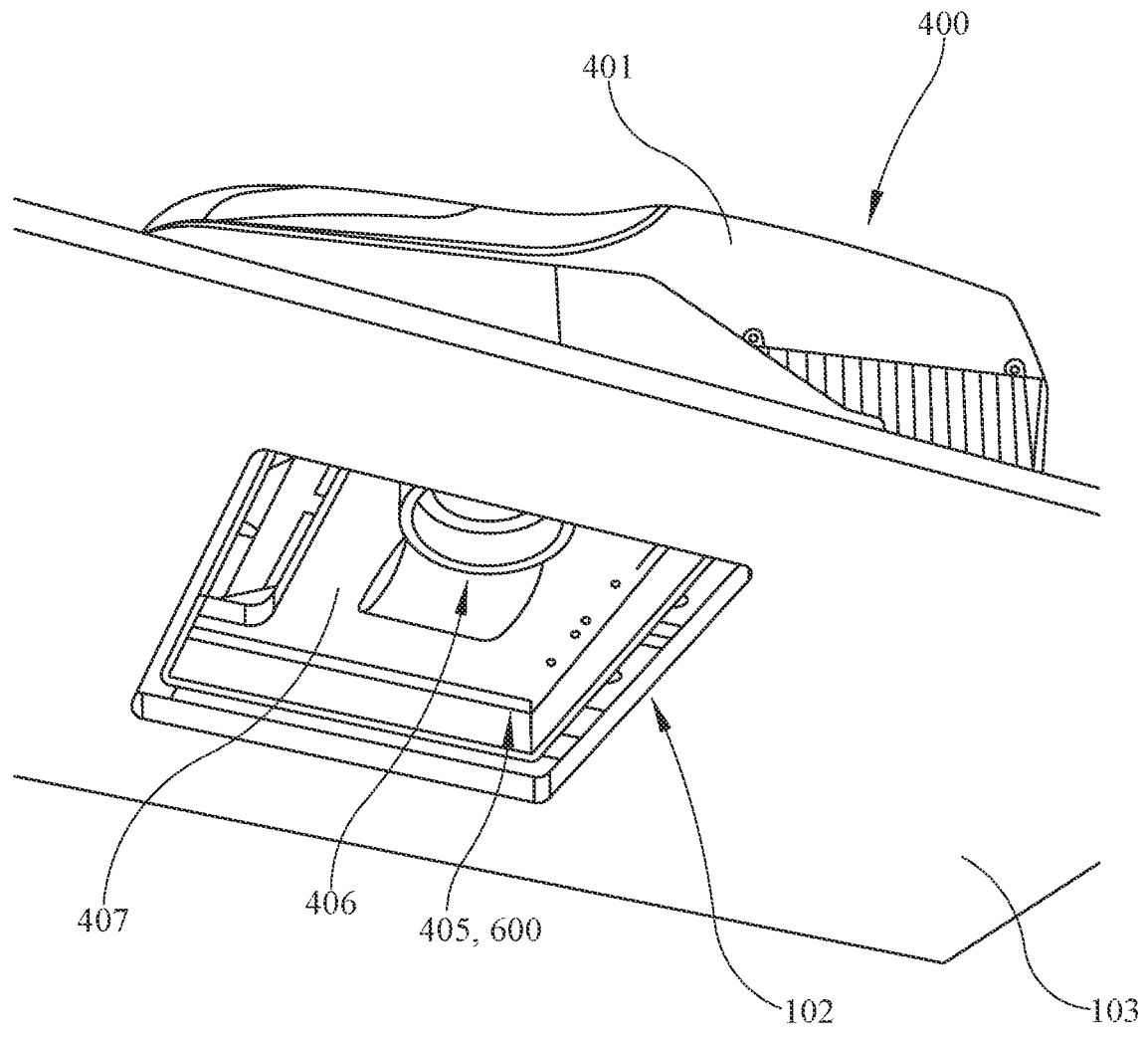
FIG. 5 illustrates a perspective view from below of the air conditioning unit or air conditioner of the modular climatization system of FIG. 1 placed on a roof cut-out.

In FIG. 5, the bottom side of the air conditioning unit or air conditioner 400 is illustrated when seen through the roof cut-out 102. The first pipe section 406 and the base plate 407 are integrally formed as a one-piece component. Furthermore, fixing means 405 are provided in the area of the roof cut-out 102 or, more precisely, in the area of the opening 201 of the mounting frame 200. The fixing means 405 are present at the base plate 407 and are represented by bores 600. The bores 600 extend vertically so that the air distribution unit 500 can be fixed with screws 601 vertically through the opening 201 as will be described further below.

Figure 6:
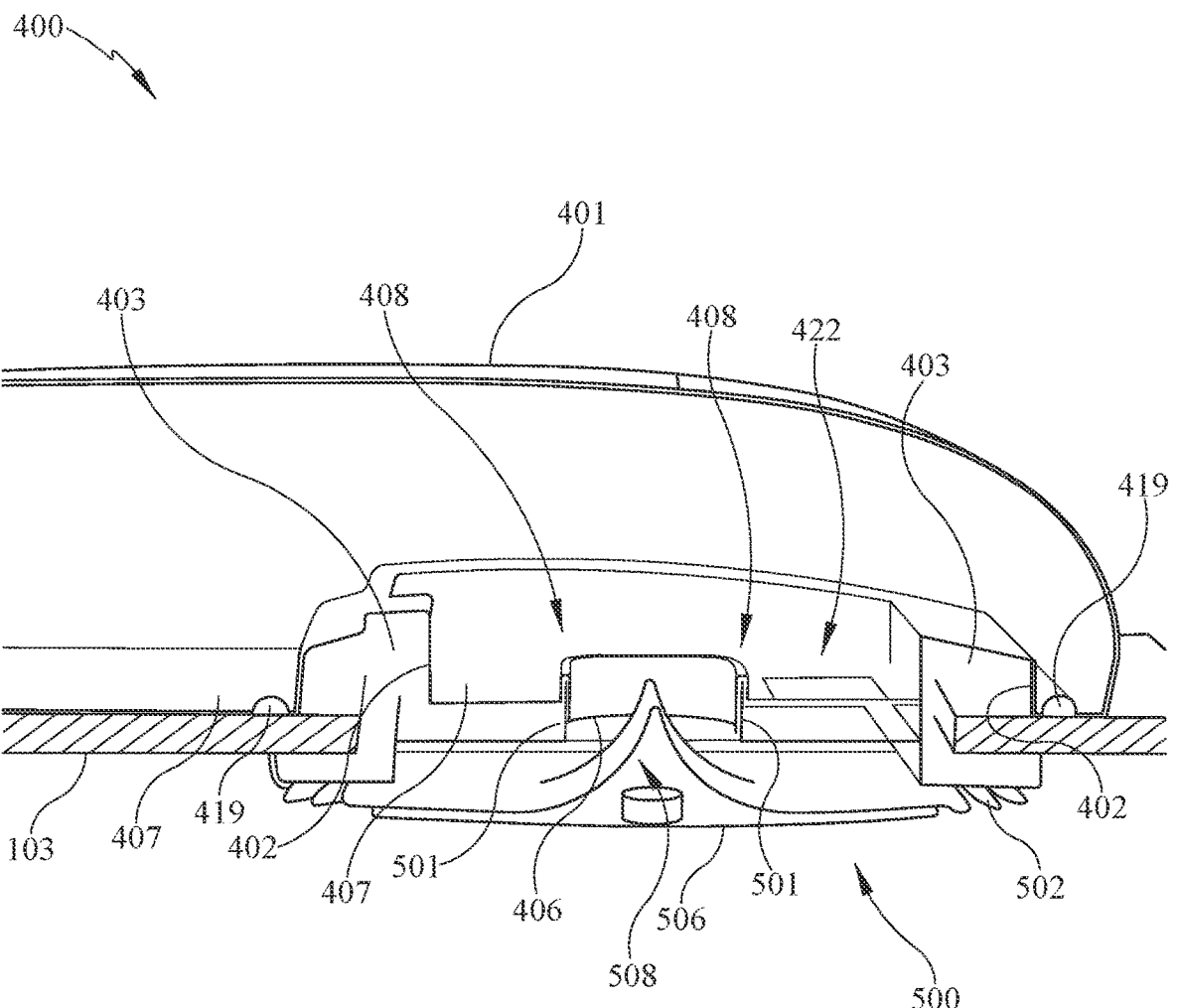
FIG. 6 illustrates a lengthwise cross-sectional view through an air conditioning unit or air conditioner and an air distribution unit according to another embodiment.

FIG. 6 displays a lengthwise cross-section through the air conditioning unit or air conditioner 400 and illustrates the air distribution unit 500 according to another embodiment. For a better overview, in FIG. 6 the mounting frame 200 is not shown. Furthermore, in FIG. 6 also the interior of the air conditioning unit or air conditioner 400 is left aside. Starting with the air conditioning unit or air conditioner 400, the concentric arrangement of the groove 419 for the gasket 404, the cavity 403 for accommodating the upper component 206 of the mounting frame 200 and the first pipe section 406 can be seen, all of which are formed together with the base plate 407 as one integral component. The cavity 403 includes substantially vertical walls serving as the abutting portions 402. Besides the first pipe section 406, a further opening 422 is provided in the base plate 407 and, corresponding thereto, in the air distribution unit 500 through which a further air flow path reaches for the air sucked in by the air conditioning unit or air conditioner 400.

At the transition from the base plate 407 to the first pipe section 406, the recess 408 accommodates the second pipe section 501 of the air distribution unit 500. The air distribution unit 500 is located at the ceiling 103 and is fixed to the air conditioning unit or air conditioner 400, while in FIG. 6 the respective fixing means are not shown either. The air distribution unit 500 includes the filter cover 506. The air stream dividing portion 508 of the air distribution unit 500 is located with its tip reaching through the second pipe section 501 and guides the conditioned air towards the air deflecting elements 502. Also, not shown in FIG. 6 are the means for providing the air flow path that is sucked in the air conditioning unit or air conditioner 400 through the base plate opening 422. The air flow paths through the first and second pipe sections 406, 501 are separate from each other.

Figure 7:
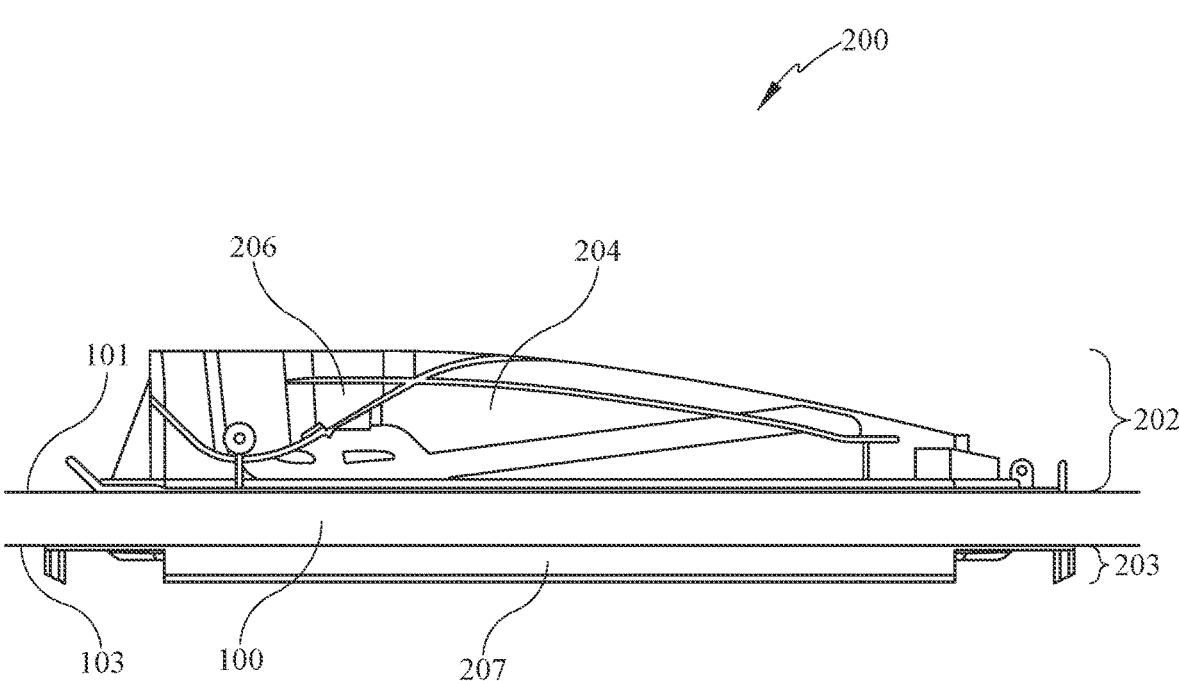
FIG. 7 illustrates a side view of a mounted mounting frame as shown in FIG. 3.

In FIG. 7, a side view of the mounting frame 200 in the mounted state is shown. The outward facing side 202 of the mounting frame 200 is located at the outer roof surface 101 and the inward facing side 203 of the mounting frame 200 is located at the ceiling 103. At the upper component 206 of the mounting frame 200 is the first wall part 204. The lower component 207 also serves as securing means against lateral displacement of the air distribution unit 500 with respect to the mounting frame 200. The upper component 206 of the mounting frame 200 is, however, further designed to be connected, for example pivotally connected with the window 300, for example, via hinge pins 303 (shown in FIG. 11).

Figure 8:
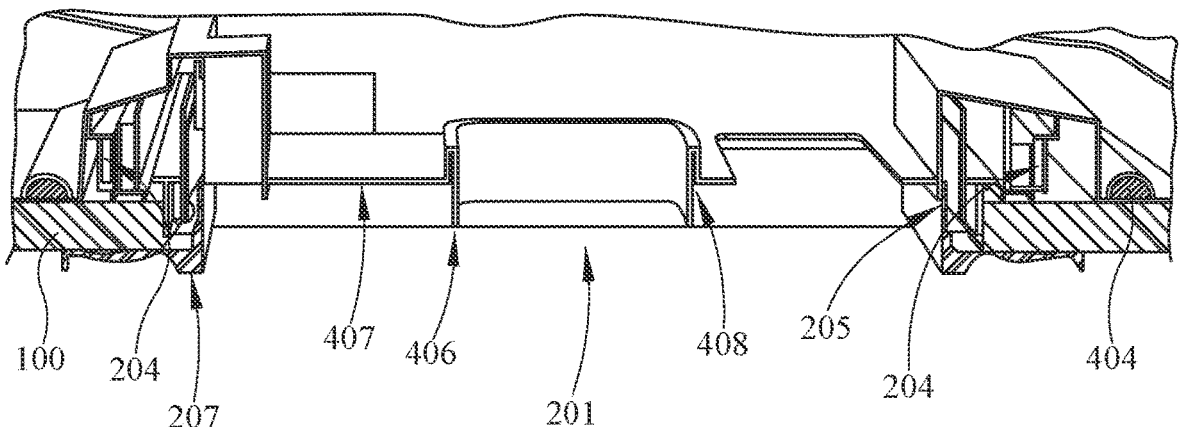
FIG. 8 illustrates a lengthwise cross-sectional view through a mounting frame and a part of the air conditioning unit or air conditioner according to the embodiment shown in FIG. 6.

FIG. 8 illustrates the mounting frame 200 together with a part of the air conditioning unit or air conditioner 400 in a cross-sectional view. In FIG. 8 the first wall part 204 and the second wall part 205 are visible both representing substantially vertical elements. The wall parts 204 and 205 are designed to correspond to and to abut against the abutting portions 402 of the air conditioning unit or air conditioner 400. In the illustrated embodiment, the first wall part 204 is provided at the upper component 206 and the second wall part 205 is provided at the lower component 207 of the mounting frame 200. The first pipe section 406 reaches halfway through the opening 201, i.e. through about half of the thickness of an average roof 100.

Figure 9:
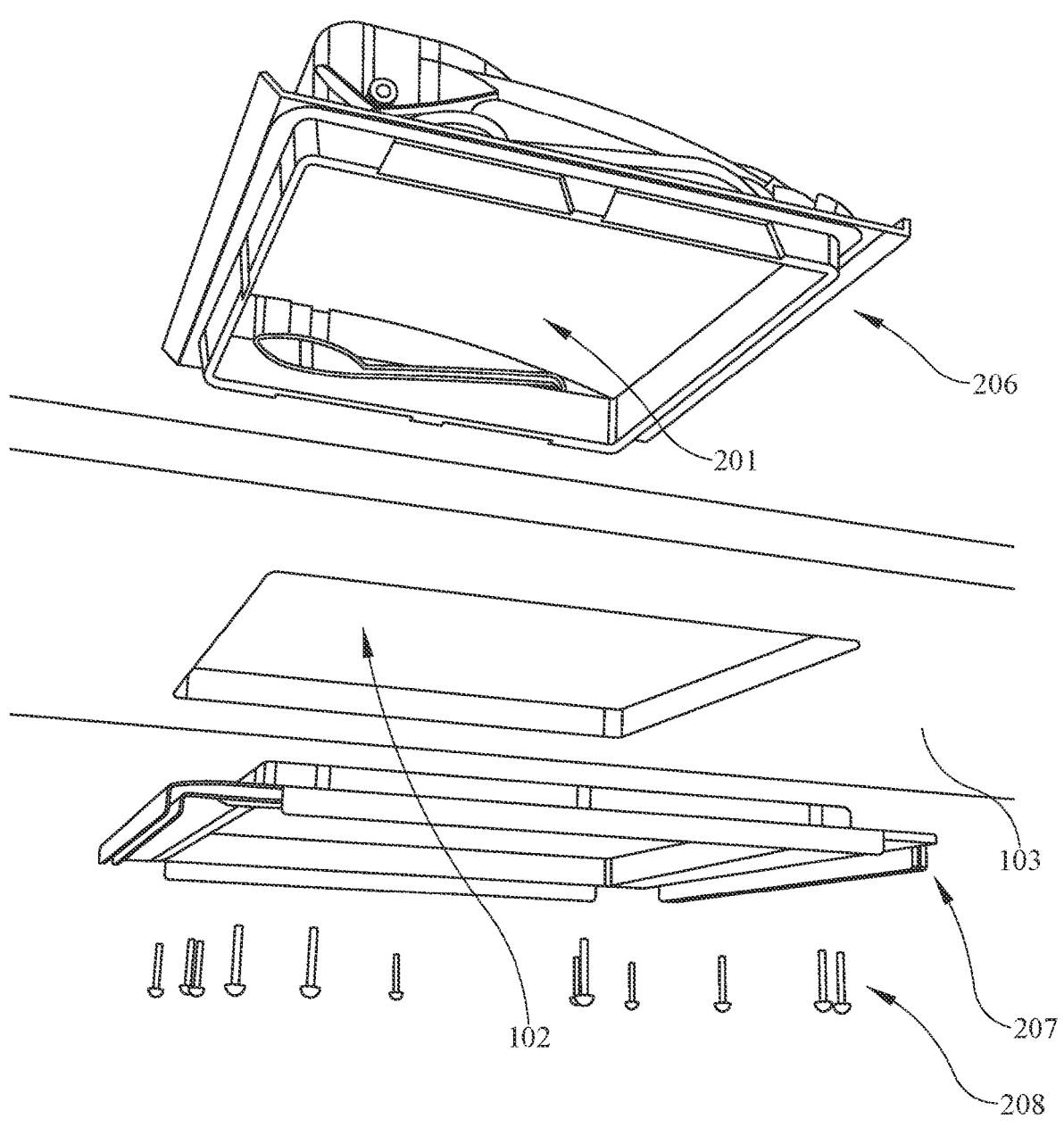
FIG. 9 illustrates an exploded view from below of the mounting frame shown in FIG. 7.

In FIG. 9, an exploded view of the mounting frame 200 is shown. Upper component 206 and lower component 207 of the mounting frame 200 are fastened to each other by a plurality of screws 208. The opening 201 defined by the mounting frame 200 is slightly smaller than the roof cut-out 102. Thus, the screws 208 for coupling the upper and lower components 206 and 207 of the mounting frame 200 reach through the roof cut-out 102 and do not need to perforate the roof 100.

In FIGS. 10 to 15, a method of replacing the window 300 with the air conditioning unit or air conditioner 400 and the shading unit 700 with the air distribution unit 500, respectively, is exemplarily illustrated. First the window 300 is present at the outer roof surface 101, indicated as step S0 of FIG. 10.

Figure 10:
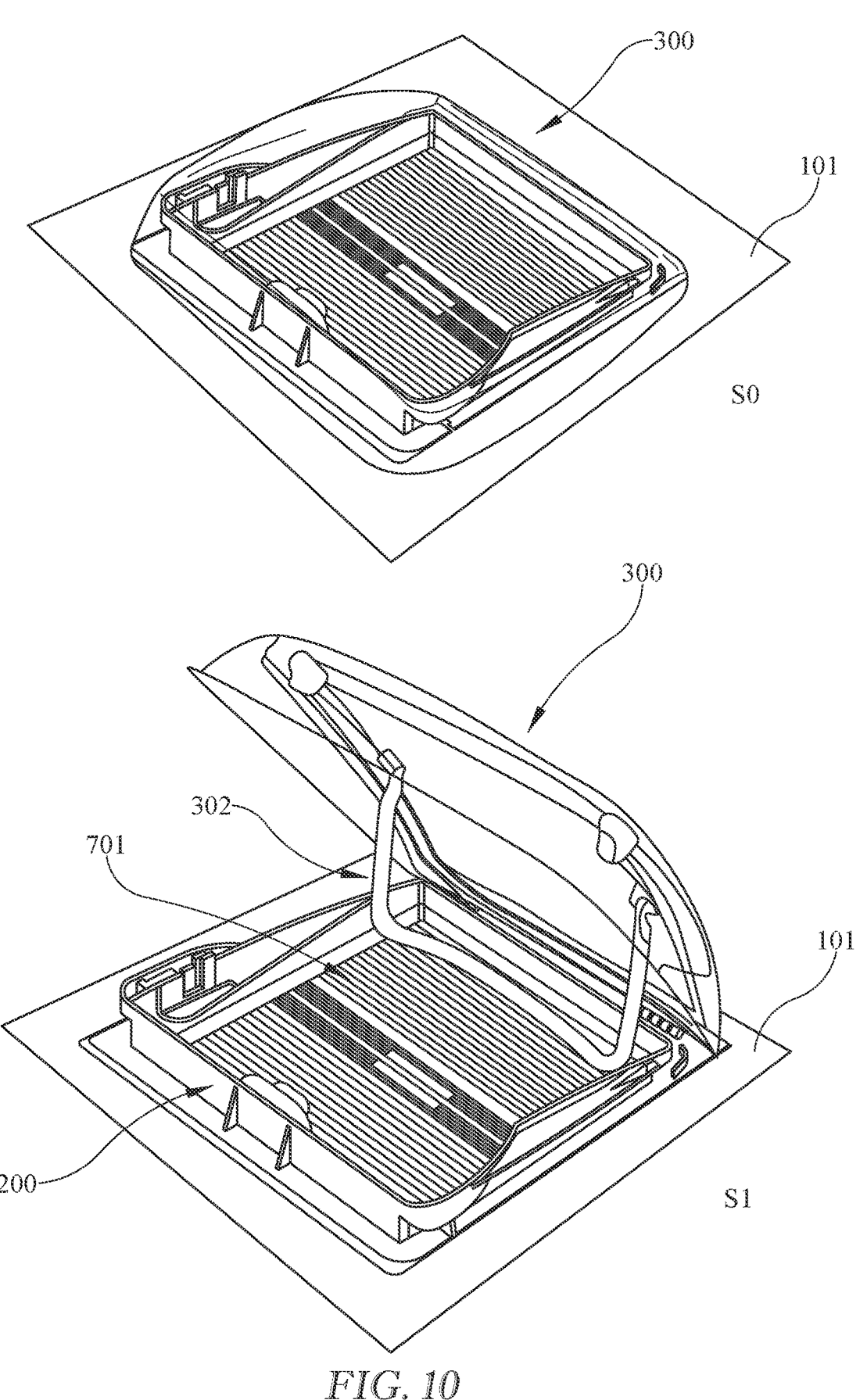
FIG. 10 illustrates steps of replacing a window with an air conditioning unit or air conditioner.

In step S1 of FIG. 10, the window 300 is opened by means of the handle 302. The handle 302 functions at the same time as window casement stays. Through the opened window, the blinds 701 of the shading unit 700 are visible and the opened window reveals the mounting frame 200.

Figure 11:
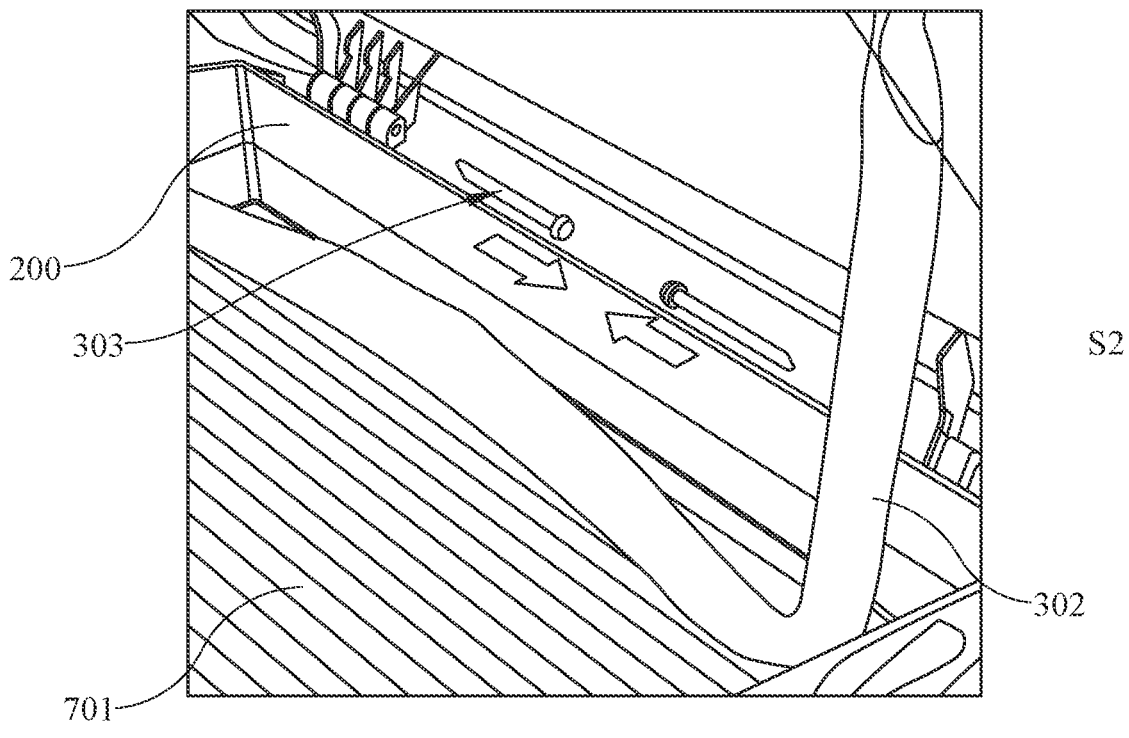
FIG. 11 illustrates steps of replacing a window with an air conditioning unit or air conditioner.
Figure 11:
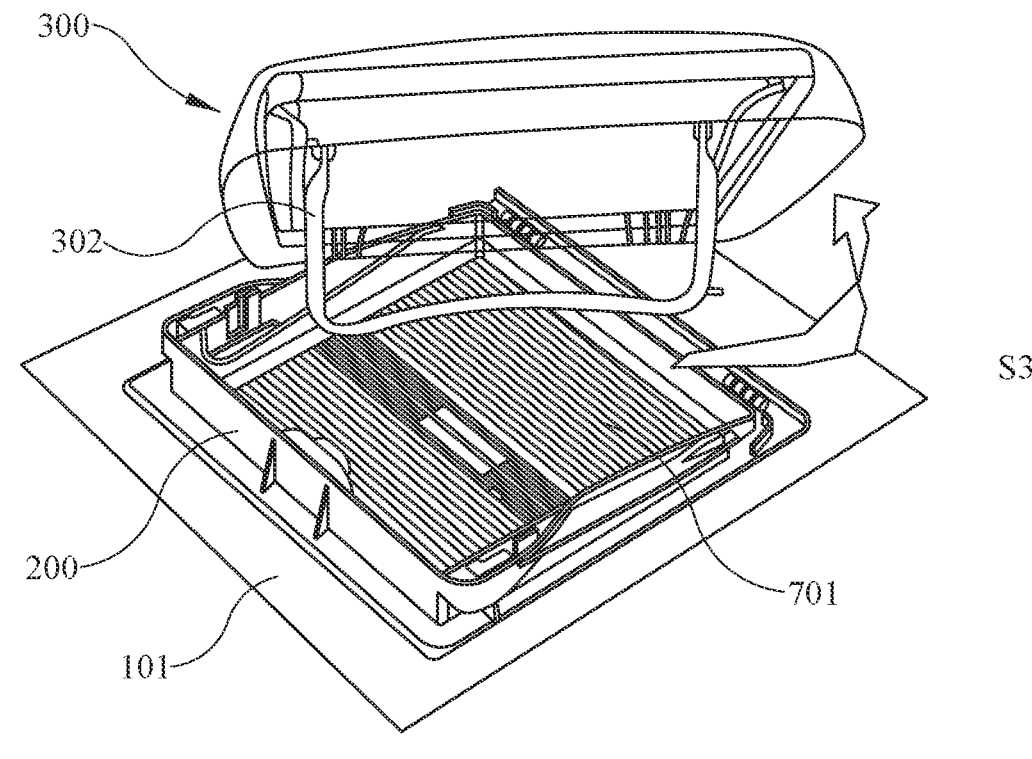

In step S2 of FIG. 11, the connection of the window 300 with the mounting frame 200 is disengaged by removing the hinge pins 303. Thus, the window 300 can be removed in step S3. In this embodiment, the window 300 can be removed by a rotational movement as indicated by the bold arrow in S3 of FIG. 11.

Figure 12:
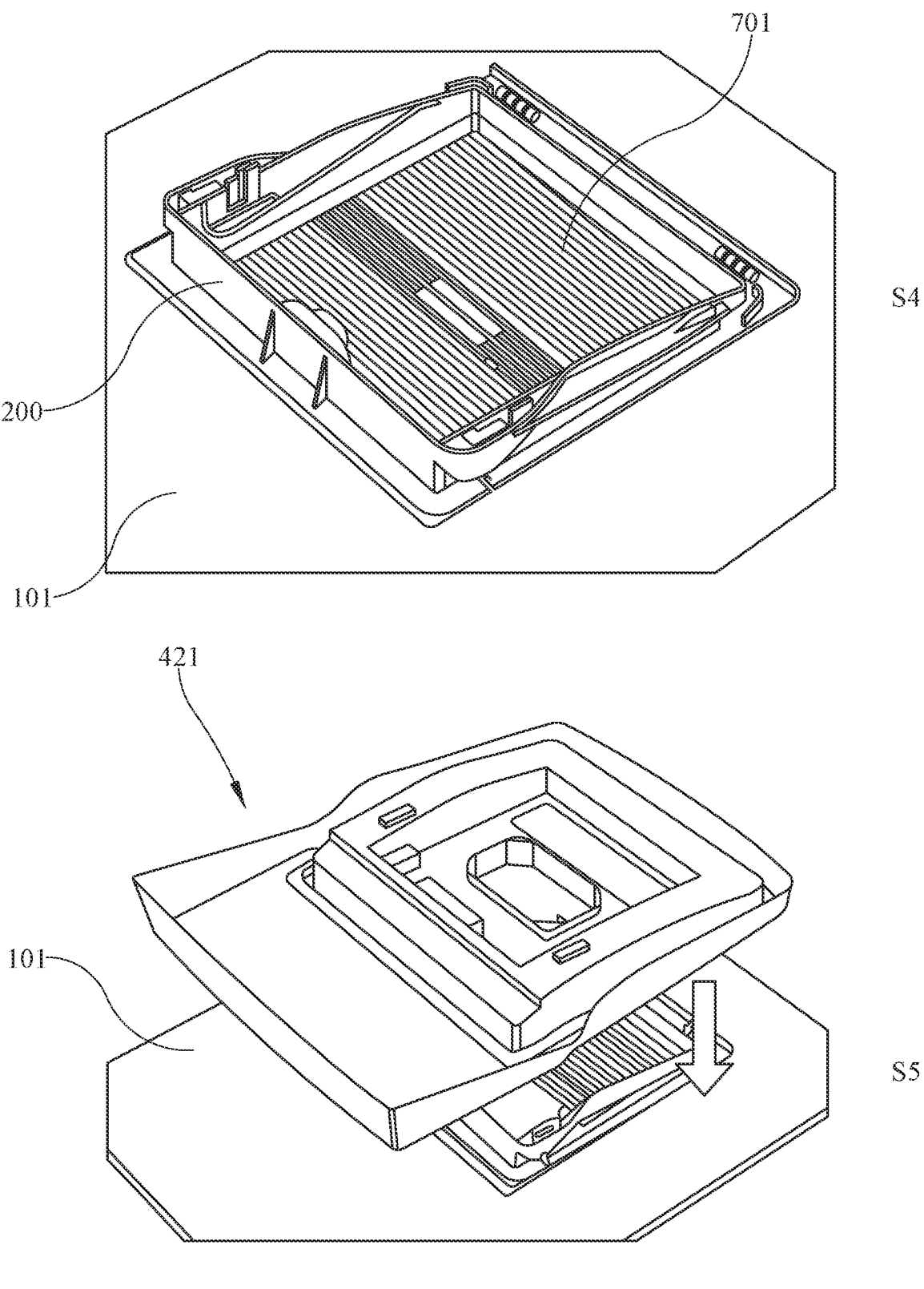
FIG. 12 illustrates steps of replacing a window with an air conditioning unit or air conditioner.

In S4 of FIG. 12, the mounting frame 200 with the window 300 being removed is shown and subsequently thereto, in S5 of FIG. 12, the base pan 421 of the air conditioning unit or air conditioner 400 is placed over the mounting frame 200. In this embodiment of the air conditioning unit or air conditioner 400, the base pan 421 is a one-piece component that includes the entire lower part of the outer cover 401 of the air conditioning unit or air conditioner 400, including the base plate 407, the groove 419, the cavity 403 and the first pipe section 406.

Figure 13:
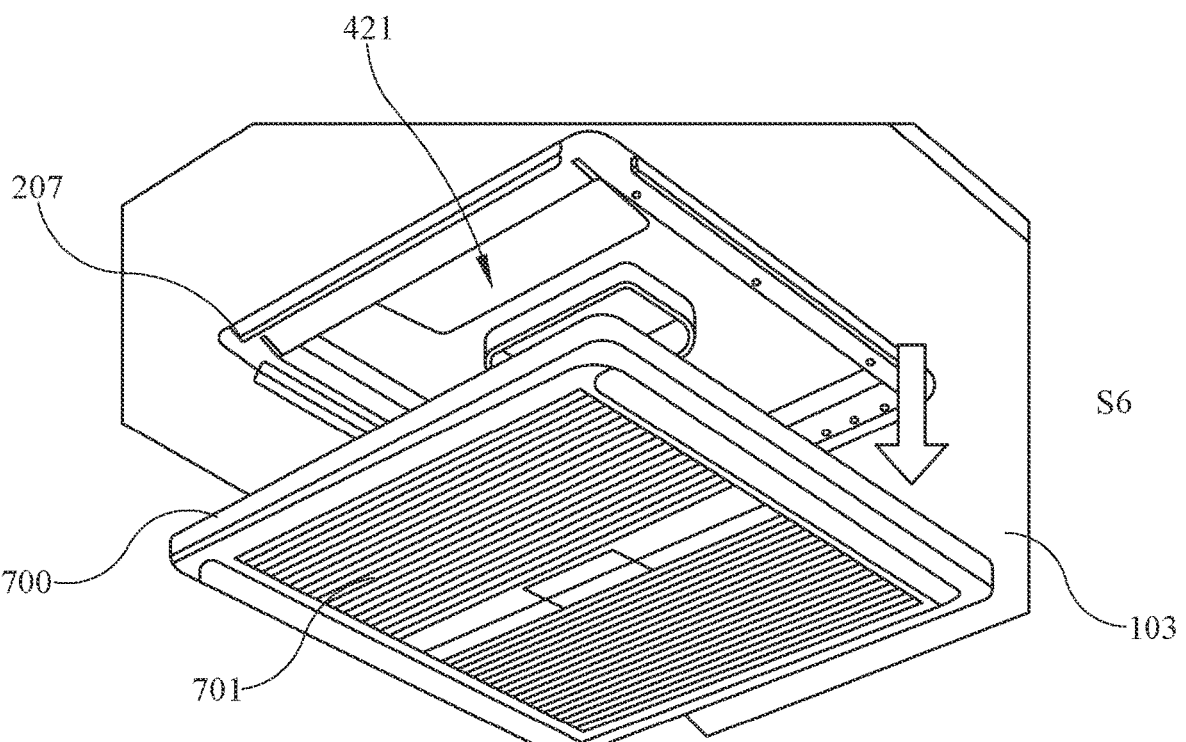
FIG. 13 illustrates steps of replacing a shading unit with an air distribution unit.
Figure 13:
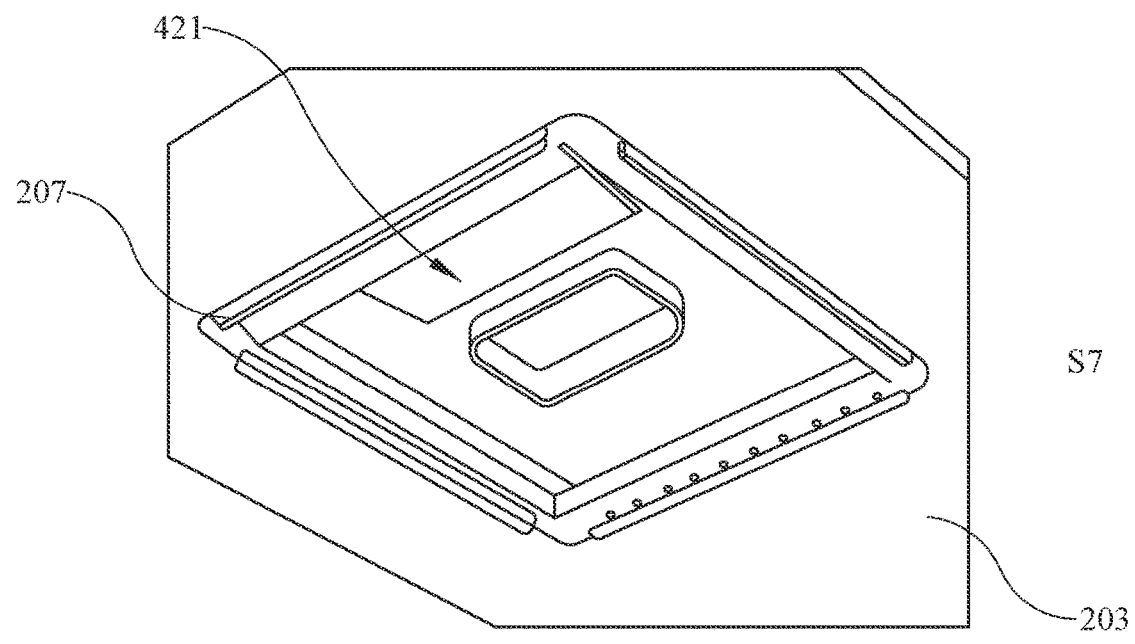

In S6 of FIG. 13 it is turned to the inside of the recreational vehicle and the removal of the shading unit 700 is shown, revealing the lower component 207 of the mounting frame 200. A part of the base pan 421 is visible through the opening 201. In S7 of FIG. 13, the mounting frame 200 with the shading unit 700 being removed is illustrated.

Figure 14:
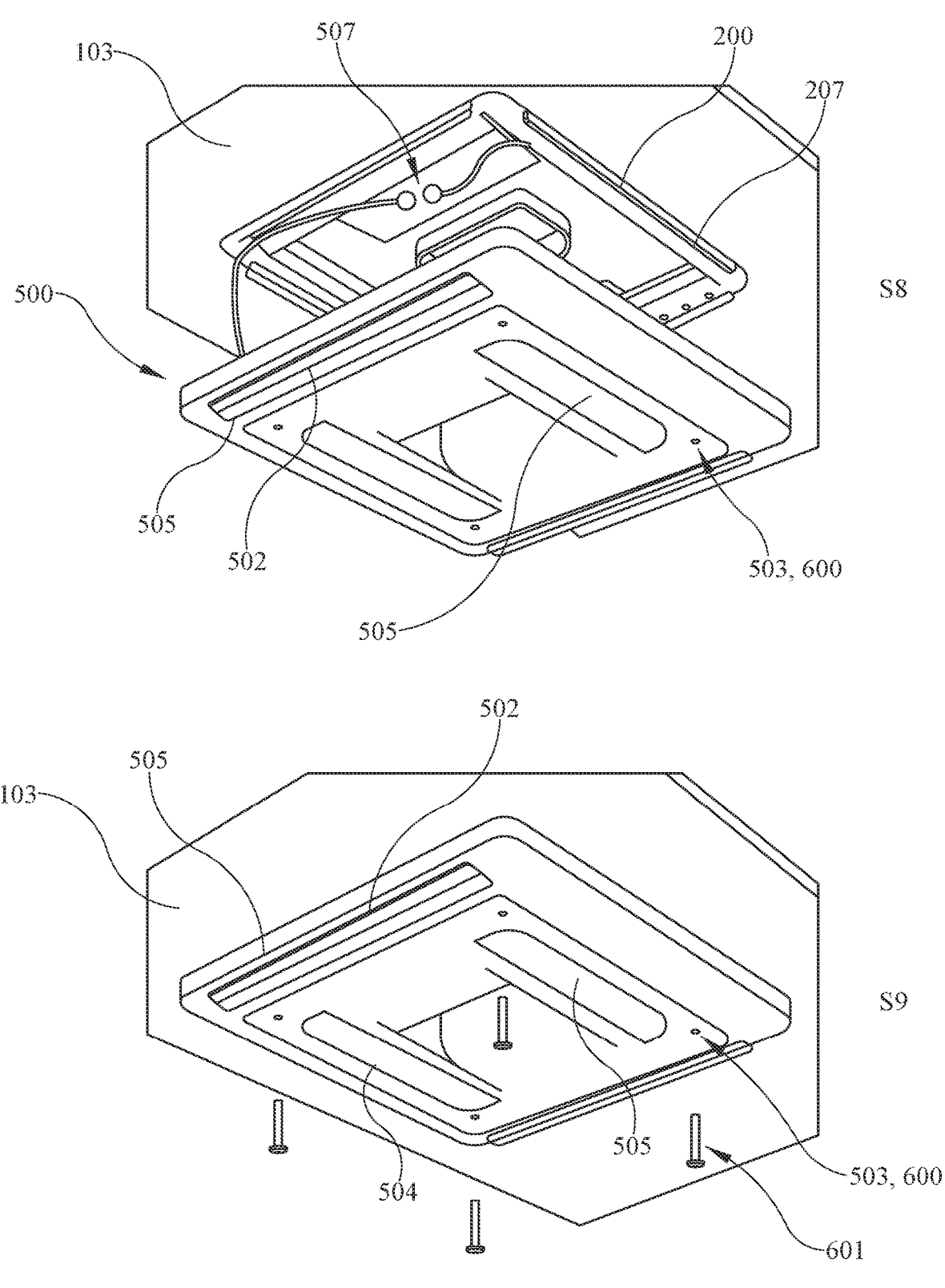
FIG. 14 illustrates steps of replacing a shading unit with an air distribution unit.
Figure 15:
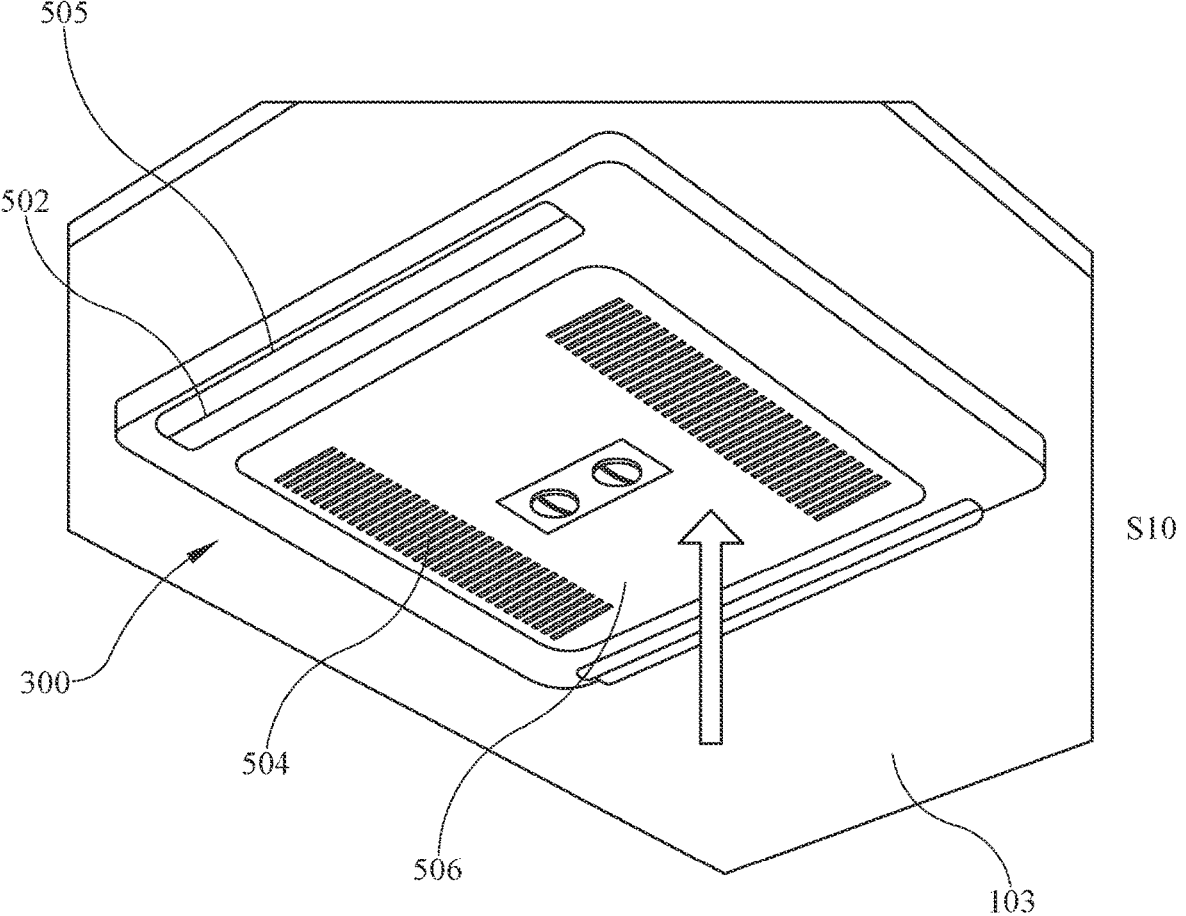
FIG. 15 illustrates a step of replacing a shading unit with an air distribution unit.

Finally, as shown in S8 and S9 of FIG. 14, the air distribution unit 500 is mounted to the air conditioning unit or air conditioner 400. First, the cable connection 507 between the air distribution unit 500 and the air conditioning unit or air conditioner 400 is established (see S8). Then, the air distribution unit 500 is placed over the lower component 207 of the mounting frame 200, followed by fixing the air distribution unit 500 with screws 601 through the bores 600 to the air conditioning unit or air conditioner 400. In the center of the air distribution unit 500, the underside of the air stream dividing portion 508 can be seen which, in S10 of FIG. 15 is finally covered by the filter cover 506.

Figure 16:
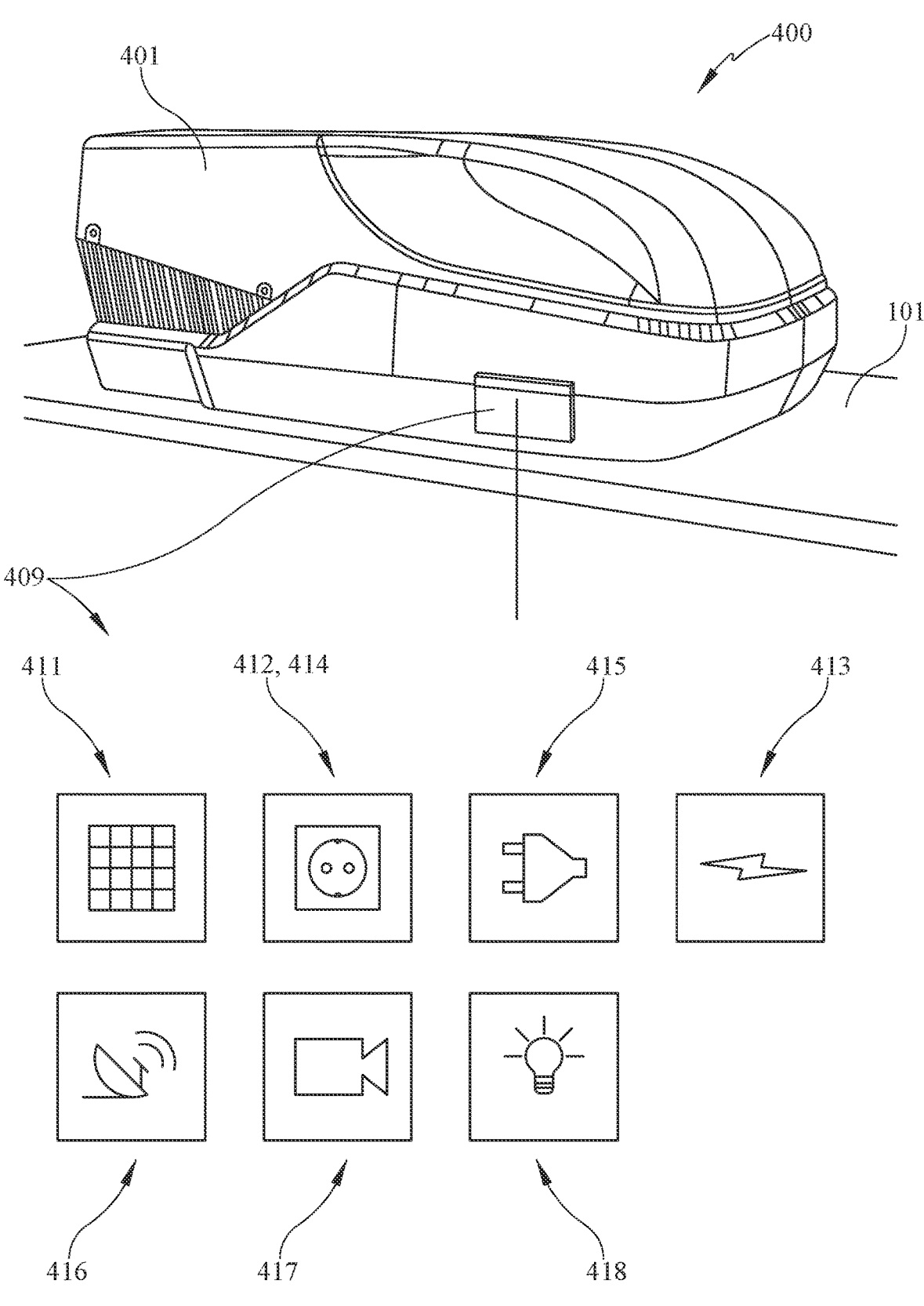
FIG. 16 illustrates a perspective view of an air conditioning unit or air conditioner with a connection port and different options for connection ports.

With reference to FIG. 16, the connection port 409 is now explained in more detail. On a side of the outer cover 401 of the air conditioning unit or air conditioner 400 the connection port 409 is or the connection ports 409 are present near the outer roof surface 101. The connection ports 409 are coupled via the air conditioning unit or air conditioner 400 with a wire or wirelessly to the inside of the recreational vehicle, advantageously with a control interface (not shown) or with a power source. Additionally, a connection port may be just a cable to supply energy to the air conditioning unit or air conditioner 400.

The connected external device can be any suitable device. As exemplarily shown in FIG. 16, the connection ports 409 include a socket 412 for providing direct current.

According to another embodiment or additionally, the connection ports 409 include an inverter 413 and a socket 414 for providing alternating current.

According to another embodiment or additionally, the connection ports 409 include a plug 415 for plugging the air conditioning unit or air conditioner 400 to an external source of electricity.

According to another embodiment or additionally, the connection ports 409 include a solar panel connection port 411. This embodiment is already described above with reference to FIG. 2. The solar panel 410 is simply plugged in the connection ports 409 of the air conditioning unit or air conditioner 400.

According to another embodiment or additionally, the connection ports 409 include an antenna connection port 416. In this embodiment, an antenna, like a satellite dish, is placed on the roof 100 as usual and simply has to be plugged in the air conditioning unit or air conditioner 400.

According to another embodiment or additionally, the connection ports 409 include a camera connection port 417. A camera can be plugged in the connection ports 409 at the air conditioning unit or air conditioner 400. The camera is thus supplied with electricity and can transfer its data via the air conditioning unit or air conditioner 400 to a receiving device (not shown) like the aforementioned interface (not shown).

According to another embodiment or additionally, the connection ports 409 include an external light connection port 418. Thereby, a light can be plugged in the connection ports 409 at the air conditioning unit or air conditioner 400. Preferably, the light intensity can be controlled via the interface (not shown).

Figure 17:
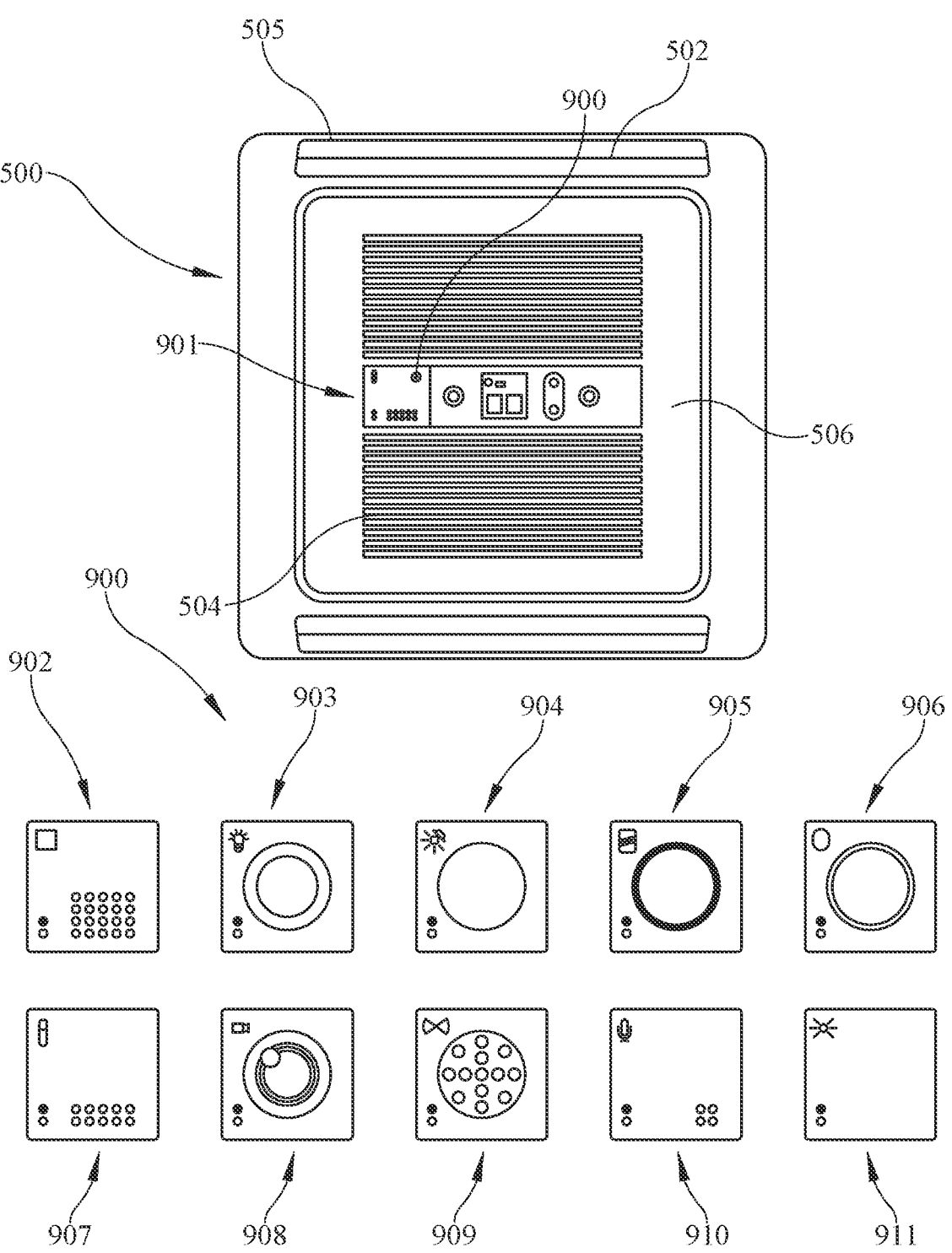
FIG. 17 illustrates a plan view onto an air distribution unit with an attachment portion for a module and several examples of modules.

In FIG. 17, a component part being the air distribution unit 500 is shown having the attachment portion 901 at the filter cover 506 aside the slots for the air inlet 504. The attachment portion in FIG. 17 is capable of attaching one module 900 which can be selected from a number of different modules 900. The module 900 to be connected to the air distribution unit 500 is clipped in at the attachment portion 901 by the user. The attachment portion 901 is equipped with a clip-fix or snap-in mechanism (not show) with which fixing and removing is easy to achieve.

Depending on what is currently needed, a module 900 can be selected from a temperature sensor 907, a pressure sensor 902, a camera 908, a motion sensor 909, a light sensor 904, a microphone 910, an air quality sensor, in particular a smoke sensor 905, a humidity sensor 906, a vibration sensor 911, a light source 903 and a speaker (not shown).

Each one of the sensors measuring certain events or parameter changes inside the recreational vehicle, like the temperature, can send the respective information to an external device (not shown) or to an interface (not shown).

Figure 18:
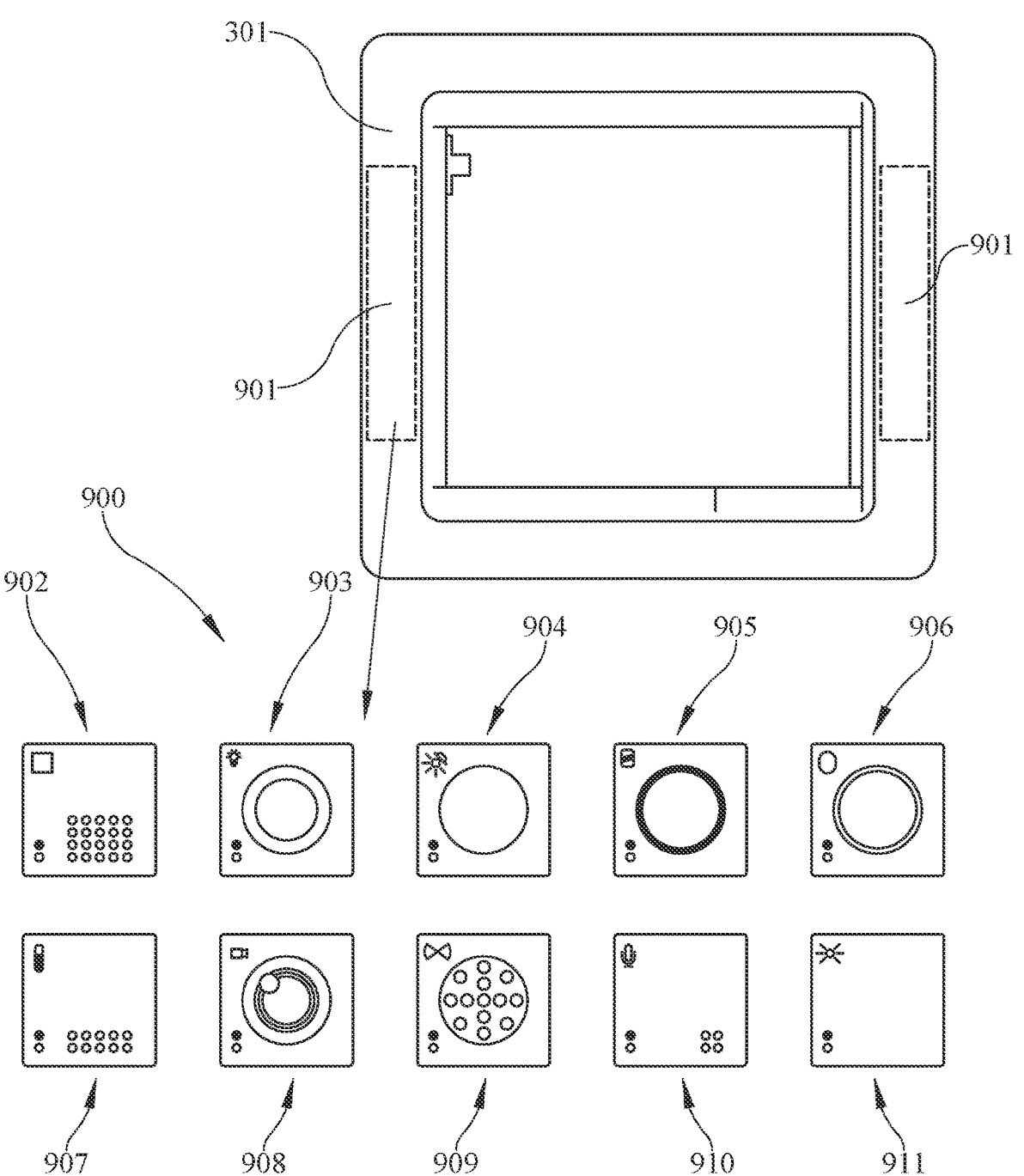
FIG. 18 illustrates a plan view onto a decorative window frame with a plurality of attachment portions for modules and the examples of modules as shown in FIG. 17.

In FIG. 18, the decorative window frame 301 is shown as the component part being equipped with the modules 900. In comparison with the air distribution unit 500 of FIG. 17, the window frame 301 has a plurality of such attachment portions 901 being illustrated by the dashed rectangles. Thereby, next to one, preferably a plurality of modules, e.g. two, three, four, five, six, seven or eight modules can be attached to the window frame 301 at the same time. Of course, there is no difference or limitation in selecting the modules 900 in comparison with the air distribution unit 500 as the component part equipped with the attachment portions 901.

Regardless of which part is the component part being equipped with the removably and exchangeably connected modules 900, the attachment portions 901 are equipped with electric contacts to provide power to the modules 900. As such, the modules 900 do not need a battery. In an advanced embodiment, the modules 900 are supplied with power from the same power source the air conditioning unit or air conditioner 400 has. Here, electric power is supplied via the mounting frame 200 to the air conditioning unit or air conditioner 400 and via the air conditioning unit or air conditioner 400 to the air distribution unit 500 or the decorative window frame 301, respectively, and to each attachment portion 901 present thereon. Alternatively, the power can be supplied directly from the mounting frame 200 to the air distribution unit 500 or the decorative window frame 301, respectively, and to each attachment portion 901 present thereon. In some examples, the attachment portions 901 for the modules 900 provide both power supply and signal transmission. For this purpose, electronic circuits for the signal transmission from and to the modules 900 are provided within the modular system, in particular, within the air distribution unit 500, the decorative window frame 301 and the mounting frame 200.

Figure 19:
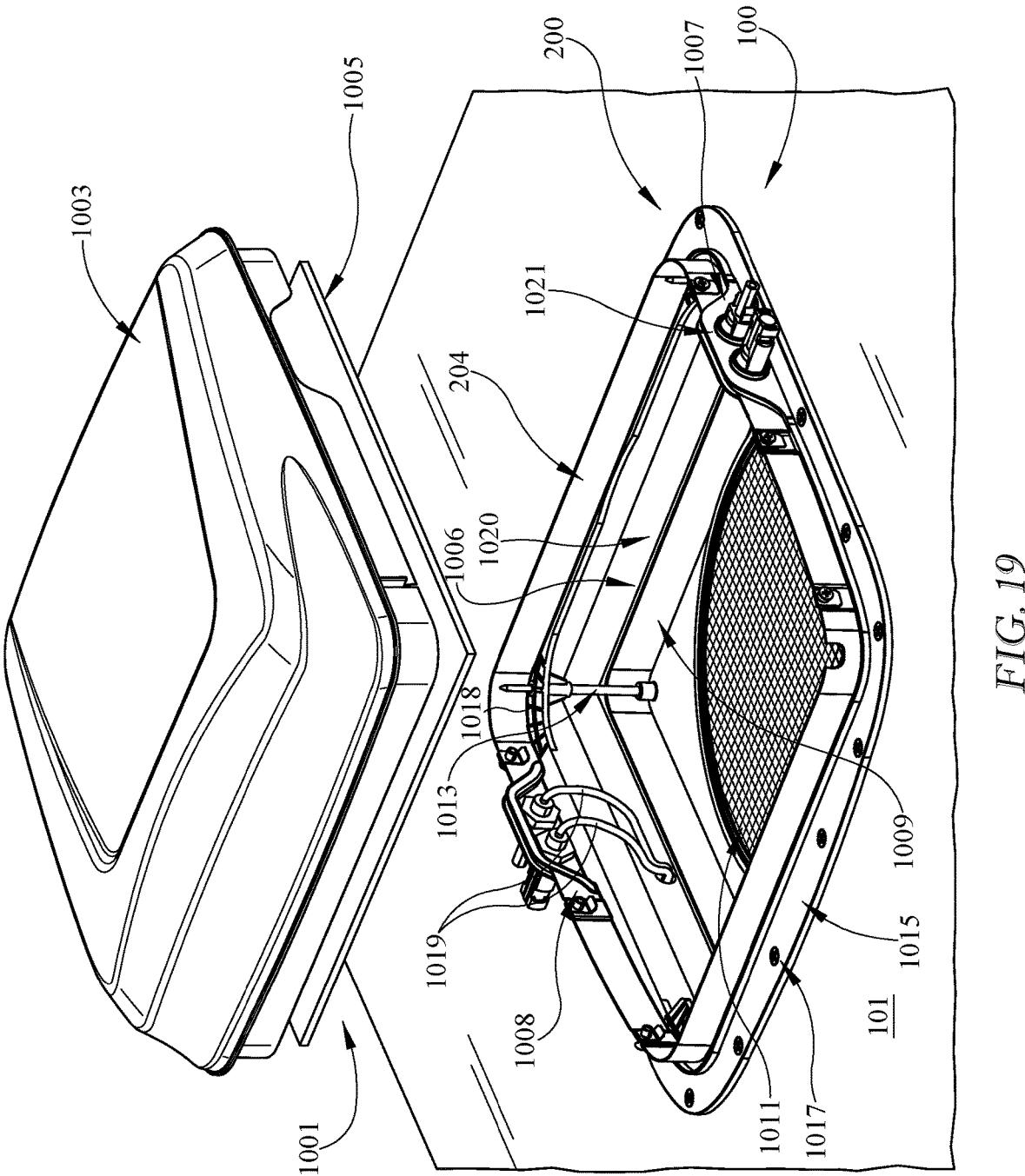
FIG. 19 is a partially exploded perspective view of a modular frame mounted in a roof and an exploded vent fan.

Referring now to FIG. 19, a further embodiment of the mounting frame 200 is depicted in a partially exploded perspective schematic view and with respect to a ventilation fan assembly 1001. The mounting frame 200, as noted, may be used for a variety of air handling or devices including air conditioning units or air conditioners, ventilation units, windows or skylights, and various other roof mounted equipment. The embodiment of the instant figure depicts a ventilation fan 1001 which is mounted to the roof or a substrate 100 of a recreational vehicle ("RV"). The exploded view depicts a fan assembly 1001 including a housing or shroud 1003 located above the upper surface, or roof, 100 of the recreational vehicle or alternatively may be used for cooling of a fixed, land-based structure as well. In some non-limiting examples, the ventilation fan 1001 may draw interior air from within the RV to the exterior, or alternatively the ventilation fan assembly 1001 may draw exterior air from outside the RV to the interior.

The components of the ventilation fan are partially shown but generally hidden within a housing or vent cover 1003 and will not be described in great detail. A circular fan and a motor (not shown) may be located within the vent cover or housing 1003. A fan cowling may extend from a fan plate 1005. The plate 1005 and fan may be located in or above an opening in the roof 100. In some embodiments, a fan and plate 1005 may be disposed within an opening 201 of the frame 200. The fan may be aligned with the opening 201 in the roof to move air into or out of the recreational vehicle (RV).

Below the roof 100, an interior trim assembly 1009 is positioned beneath the mounting frame 200. The interior trim 1009 is disposed over an opening 1006 in the ceiling 103 and around the edge of this opening 1006 along an inner surface of the recreational vehicle, for example along the ceiling 103. This interior trim 1009 covers any tolerances between the mounting frame 200 and the opening 1006 and creates a clean appearance from the inside of the vehicle. Additionally, the interior trim 1009 may provide functions such as air flow registers, vents, lights, control buttons, actuators, and the like. The interior trim 1009 may also have an opening 1011 to allow air flow or light to move therethrough. The opening 1011 may be centrally located or may be offset from central if spacing is needed for other components, controls, or the like.

Between the fan plate 1005 and the interior trim 1009, a plenum is formed. The plenum defines a flow path for air flow between the fan assembly 1001 and the interior of the recreational vehicle. The plenum is generally bounded by the mounting frame 200, the interior trim 1009 and the vehicle ceiling 103, including any space between the roof (exterior) 100 and the ceiling (interior) 103 which for example may be formed by structural members.

Positioned on the upper surface 101 of the roof 100, is the mounting frame 200. The mounting frame 200 may be positioned solely on the exterior of the roof 100, or may also be positioned on the upper outside surface 101 and extend downwardly through the opening 201 in the roof surface 101. Additionally, while the examples in the various figures show the common roof or generally horizontal mounting configuration, one skilled in the art will appreciate that the frames of the various embodiments may likewise be installed in a side wall or more generally vertical surface of a vehicle.

In the depicted embodiment, the interior trim 1009 may comprise a fastener 1013 that extends through the interior trim 1009 and upwardly to engage the mounting frame 200. The fastener 1013 pulls the interior trim toward the mounting frame 200 along the opening in the roof 100 and through the ceiling 103 of the vehicle. This effectively clamps the frame 200 and the trim 1009 together on the roof 100, ceiling 103 and structural members or framing 1020 therebetween. In an alternative construction, screws or fasteners may extend through the frame 200, through the roof 100, and into the interior trim, or in the opposite direction.

The mounting frame 200 is depicted as generally square shaped but various alternate shapes may be utilized. The mounting frame 200 has the opening 201 allowing air flow or light through the mounting frame 200 and between the exterior (ambient) and the interior, or between interior air and air conditioning components.

In the depicted embodiment, the mounting frame 200 may comprise a frame flange 1015 that is generally flat, horizontal, and positioned on the upper surface 101 of the roof 100, or alternatively a side wall surface, of the recreational vehicle. Alternatively, the flange 1015 may comprise some curvature in one or more dimensions to match an RV roof that may be curved. The flange 1015 may comprise one or more fastening apertures 1017 to attach the flange 1015 the RV. Additionally, the flange 1015 may comprise a seal material, sealant, and/or a gasket 404 that may be positioned along a lower surface of the flange 1015 between the mounting frame 200 and the roof 100, so as to preclude leakage of fluids around the flange (between the roof and the flange) and into the vehicle. Where a gasket 404 is utilized, the gasket 404 may or may not comprise an optional sealant for example, or may or may not include an adhesive on one or both sides of the gasket 404. The gasket 404 may also be used alone or in combination with the fasteners to connect the mounting flange to the roof of the vehicle. In some configurations, the gasket material is sandwiched between the flange 1015 and the roof surface 101 and fasteners may extend through the gasket 404.

Extending upwardly from the frame flange 1015 is the one or more walls 204. The one or more walls 204 may extend about some or all sides of the mounting frame 200. The one or more walls 204 may extend along one or more sides of the frame 200. For example, in the depicted embodiment, the one or more walls 204 is shown as four walls outwardly extending from the flange 1015 and joined at ends. In the orientation depicted, with the frame 200 on a roof, the walls 204 are oriented upwardly, but may differ if the frame is located on an vertical wall. The walls 204 may be of the same height or differing height as may be needed depending on whether an air conditioning unit, ventilation unit, skylight, or other device is utilized. The or more walls 204 may define an opening in the frame 200 that is the same size as the opening 201 in the roof 100, or may be larger than the opening 201 in the roof 100. At the corners where the walls 204 join, there may be a web 1018 which extends partially into the opening 201. The web 1018 may be formed by a reinforced rib surface that extends about the interior perimeter of the walls 204 and increases in dimension at the corners of the walls 204. The web 1018 may provide a location through which the fasteners 1013 extend to clamp the roof 100 and ceiling 103 between the interior trim 1009 and the mounting frame 200.

The first wall 204 may also comprise one or more aperture plates 1007, 1008 disposed along the mounting frame 200. For example, the instant embodiment depicts two opposed aperture plates 1007, 1008 so that wires 1019 may be run from either side of the mounting frame 200. The one or more aperture plates 1007, 1008 may be disposed along one or more locations of the wall 204 and may be located in such a manner that the plate 1007, 1008 may be hidden behind a vent cover or housing 1003, or may be exposed due to the shape of the housing or vent cover 1003. In some embodiments, the aperture plate 1007, 1008 may be formed in the housing or vent cover 1003. The aperture plate 1007, 1008 may comprise one or more holes defining locations for one or more connection ports 1021.

The aperture plate 1007, 1008 may be the same thickness or a different thickness than the first wall 204. In some embodiments for example, the aperture plate 1007, 1008 may be thicker than the remainder of the wall 204 in order to provide additional strength and rigidity where wires 1019 may be connected. Additionally, the aperture plates 1007, 1008 may also be taller than the remainder of the one or more walls 204. Additionally, for example, the aperture plate 1007, 1008 may be a single plate or multiple plates. For example, the aperture plate 1007, 1008 may be first and second planar substrates that are either hollow or solid on the interior. This spacing may not only provide rigidity, but additional strength for receipt of ports and/or wires therethrough. Additionally, the hollow plates or an air gap between the plates 1007, 1008 may provide for improved insulating characteristics. In some examples, for instance as shown, the aperture plate 1007, 1008 may comprise ribs 1023 (FIG. 21) that extend about the periphery of the aperture plate 1007, 1008. The ribs 1023 perform a similar function of providing added strength in the area where the port connections 1021 are made. The ribs 1023 may be located on the either or both of the interior and/or exterior surfaces of the aperture plate 1007, 1008. Still further, in some embodiments, the aperture plate 1007, 1008 may comprise a thickened area about the periphery, for example by thickening the material or by addition of the peripheral ribs 1023, so that some area of the aperture plate 1007, 1008 is recessed. This recessed area within the peripheral ribs 1023 may provide some clearance for positioning of ports and connectors described further herein.

Further, the aperture plates 1007, 1008 comprise apertures or ports 1021. The ports 1021 for example allow for installation of connectors 1025, 1026 (FIG. 21) for various types of devices that are to be connected through the flange 1015. The aperture plate 1007 may comprise one or more ports 1021. In the depicted example two ports 1021 are shown for positioning of two connectors 1025, 1026. In the example a male and a female connector are located in the ports 1021 with wires 1019 extending along the inside of the flange 1015.

The ports 1021 may provide for various connection types that may be made from the outside of the mounting frame 200 with any of various types of appliances. Such appliances may include for non-limiting example, solar panels, inverter, air conditioner, antenna, camera, external lights, and sensors, among others. This list is non-limiting and other connections may be provided. The connectors 1025, 1026 shown are solar connectors but this is merely one example and other types of connectors may be utilized.

Figure 20:
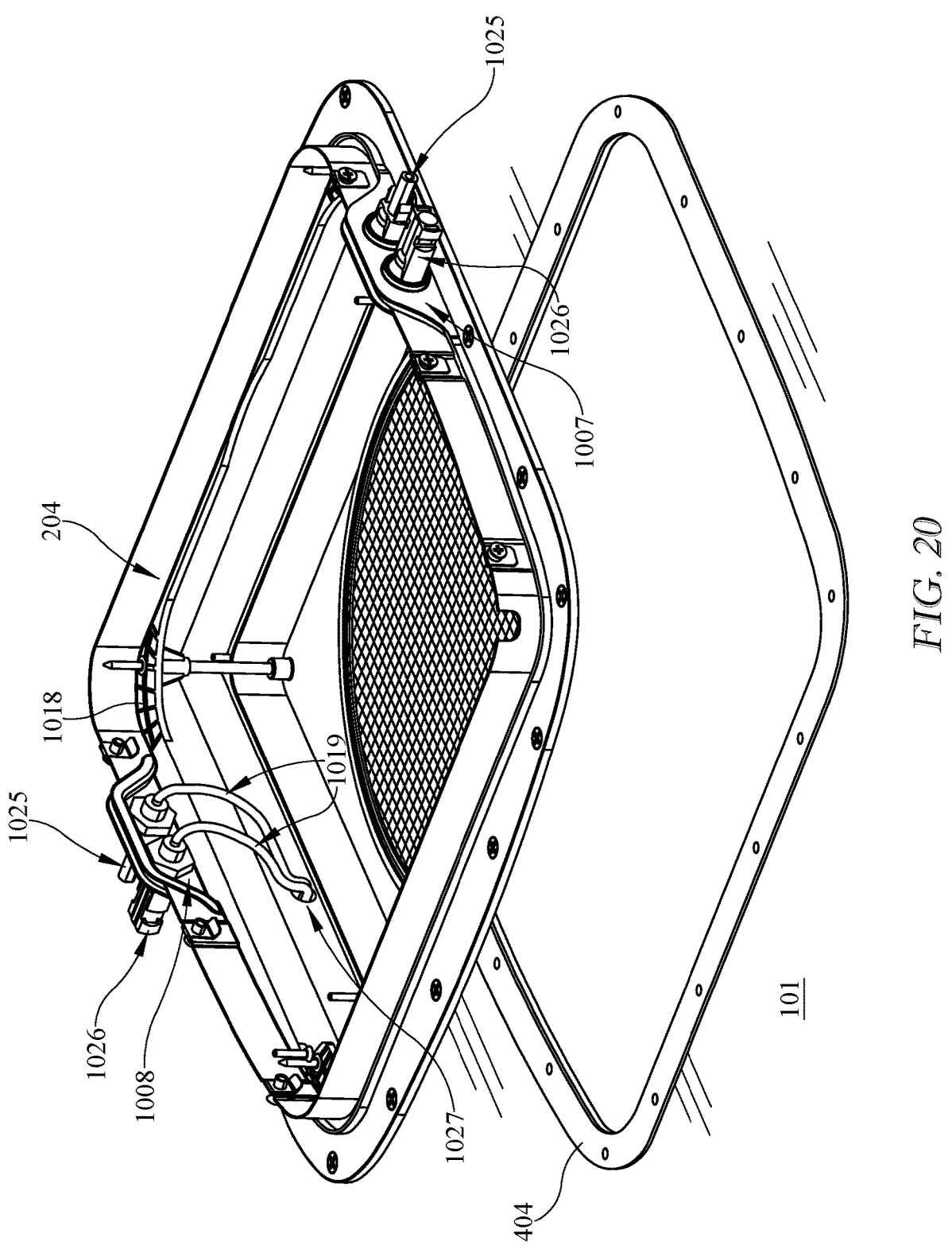
FIG. 20 is a perspective view of the frame of FIG. 19.

Referring now to FIG. 20, the mounting frame 200 is shown in detail view. The one or more walls 204 comprise opposed aperture plates 1007, 1008, including ports 1021 and connectors 1025, 1026 therethrough. In the detail view, the connectors 1025, 1026 are shown with wires 1019 extending from the inward side of the one or more walls 204, from the connectors 1025, 1026, and downwardly. The wires 1019 may pass through a hole 1027 in the material between the roof 100 and the ceiling 103. From this location, the wires 1019 may be run to any of various locations in the recreational vehicle, depending on the type of service being connected. For example, if solar panels are connected through the frame ports 1021 and connectors 1025, 1026, the wires 1019 may run to a solar controller, or to a battery bank, for example. Alternately, if lights are connected via the frame ports and connectors 1025, 1026, the wires 1019 may run to a lighting connector or to a light switch, panel of switches, or a controller from which some or all of the lighting in the RV may be controlled within the RV or by a smart device, for example. Any of various types of connections may be made.

Figures 21, 22:
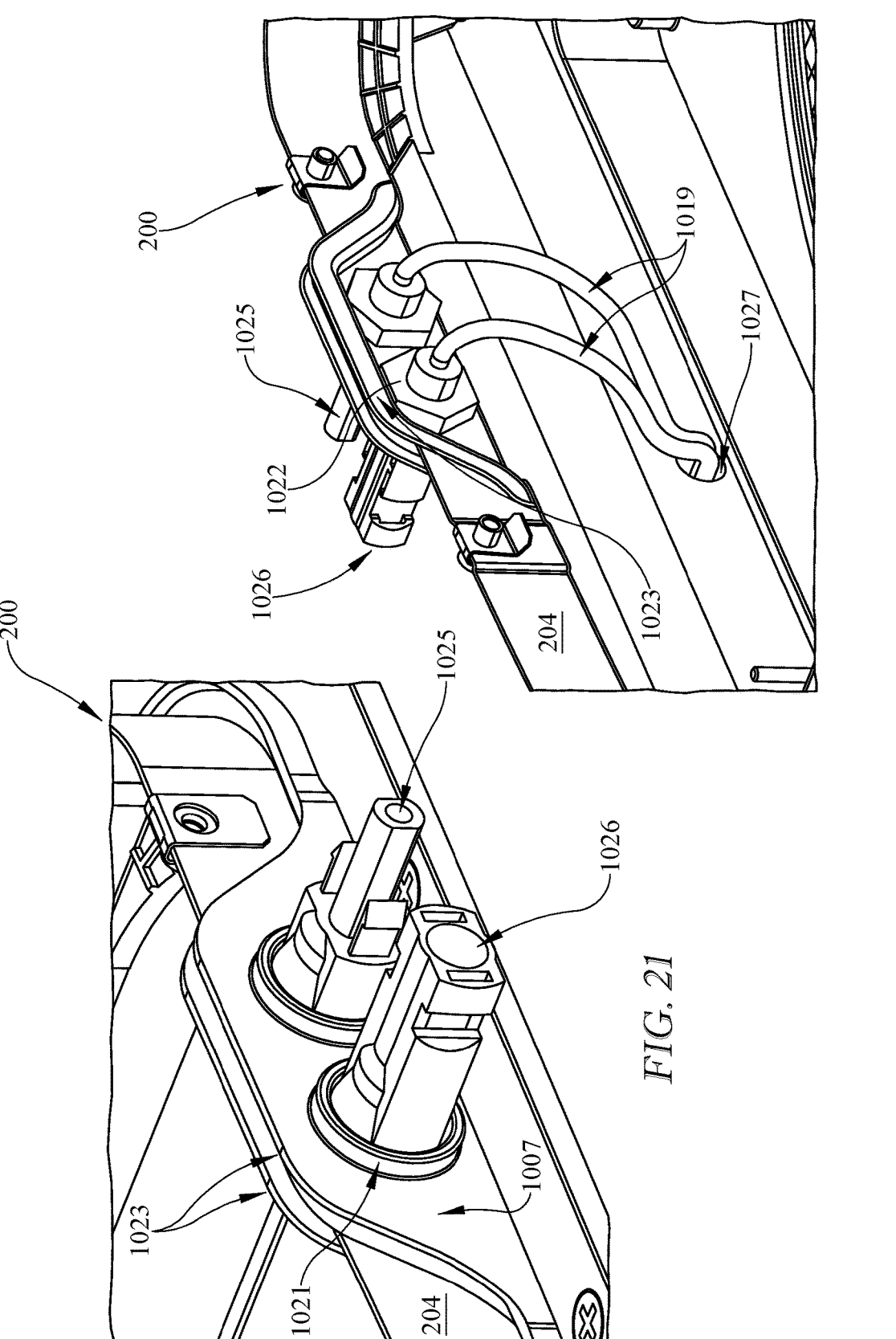
FIG. 21 is a detail perspective view of the ports and example connectors from the exterior of the modular frame.
FIG. 22 is a second detail perspective view of the ports and example connectors from within the modular frame.

With reference now to FIGS. 20-22, additional detail views are provided. In the depicted embodiment, the ports 1021 or aperture plates 1007, 1008 may comprise connectors 1025, 1026. In the depicted embodiment, the connectors 1025, 1026 are shown as solar connectors, for example MC4 connectors, which are single contact electrical connectors and are suitable for solar panel connectivity. Each connector 1025, 1026 may extend thru a port 1021 and comprise a threaded portion on a rear or inward side of the connector for example so that a nut 1022 may be threaded thereon and retain the connector within the port 1021. In some embodiments, the connectors 1025, 1026 may comprise push pin connectors to provide an electrical connection of first wires or cables from the solar panel and a second wire or cables 1019 extending into the RV. In the solar panel configuration, there is typically a positive conductor wire or cable and a negative conductor wire or cable for each of the wires or cables. The connectors each may comprise a male portion and a female portion defined by pins that are located within the connectors. The pins are crimped or soldered to the conductors of the wires or cables. Each of the connectors 1025, 1026 is formed of a coupler body which provide a sealed connection to the wire or cable 1019. Each coupler body is positioned on the exterior of the aperture plate 1007, 1008 with a threaded portion extending through the port 1021, and may further comprise an end cap on the inside of the aperture plate 1007, 1008 which threads to the coupler body and retains the wire or cable 1019 in position. An interior strain relief may also be provided within the connectors 1025, 1026. Additionally, the one of the coupler bodies may include fingers which engage ports 1021 to lock the pair of coupler bodies together. While the connectors 1025, 1026 are depicted as solar connectors, other terminal types may be utilized, or other water resistant connections may be utilized to allow passage of wires or cables, or the connections to provide electrical connectivity.

Figures 23A, 23B:
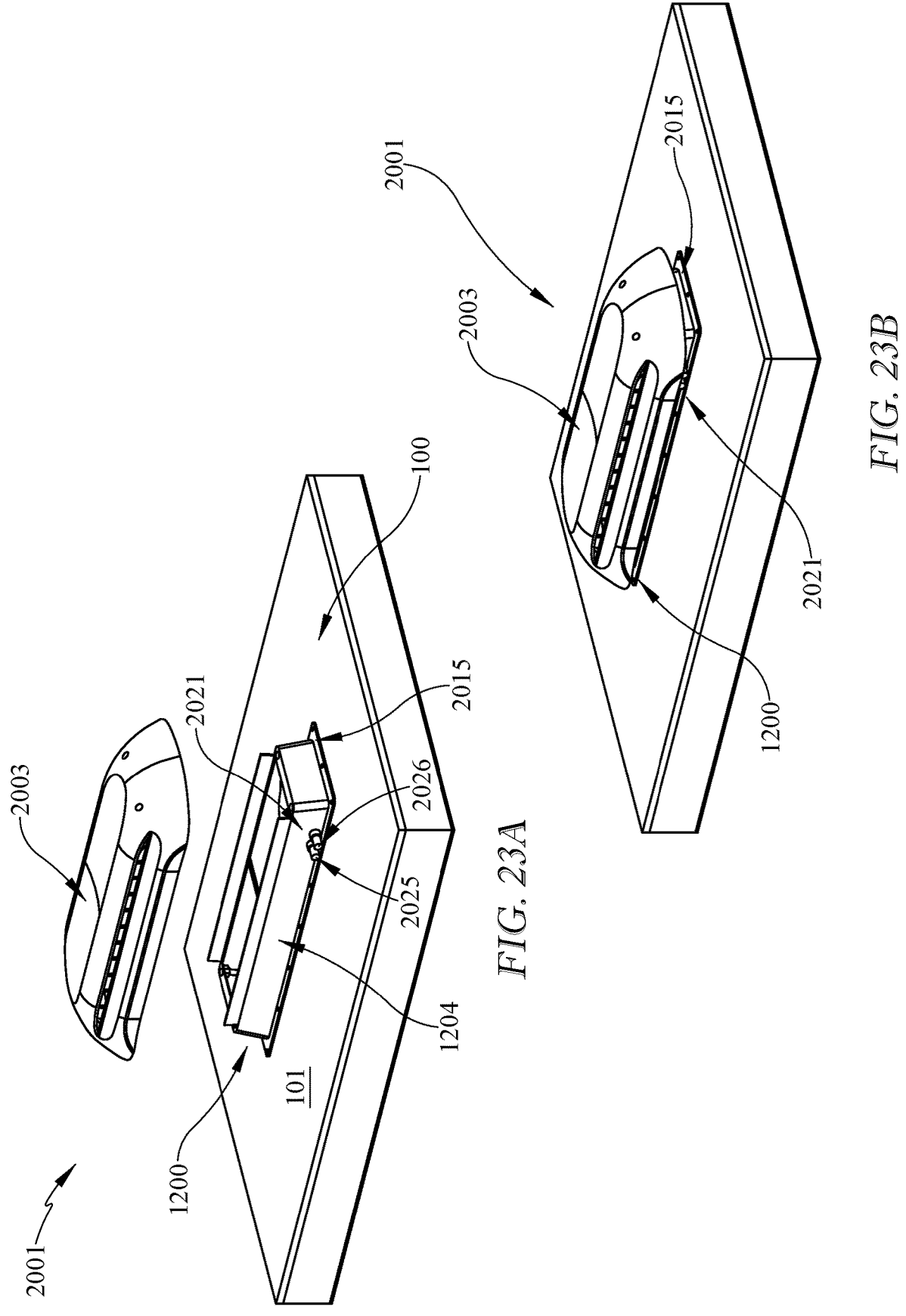
FIGS. 23A and 23B are exploded perspective views of the alternative vent arrangements with a frame that comprises ports and connectors; and, FIG. 24 is an air conditioner wherein the ports and connectors are shown extending through the housing.

Referring now to FIGS. 23A and 23B, a partially exploded perspective view and an assembled view of a further embodiment is depicted. The embodiment provides a roof vent 2001 for an appliance, for example a refrigerator. Some RV refrigerators may comprise absorption systems which utilize combustion to heat an absorption refrigerant as part of the cooling process. The roof vent 2001 provides a mounting frame 1200 that is positioned on the roof 100. The shape of the mounting frame 1200 is slightly different than the previous embodiment and may comprise a flange 2015 that is disposed against the roof surface. One or more walls 1204 may extend upwardly from the flange 2015.

Above the mounting frame 1200 is a vent cover 2003. The vent cover 2003 and the mounting frame 1200 are generally more rectangular in shape. The one or more walls 1204 is depicted as four walls, as in the previous embodiment. The walls 1204 may comprise a port 2021 that allows for external connection of wires 1019 (not shown). The port 2021 may be one or more ports and as in the previous embodiment is depicted as two ports 2021. The ports 2021 may provide connection for wires 1019 that extend from exterior to the roof vent 2001 to the interior of the roof vent 2001.

The ports 2021 may allow passage of wires into the frame 1200 and into the recreational vehicle. Thus, the connectors 2025, 2026 provide for electrical connectivity from the exterior to the interior of the recreational vehicle through the mounting frame 1200 of the roof vent 2001. The ports are shown on the mounting frame 1200, but the exterior wiring may pass through the roof vent shroud 2003, or the frame ports 2021, or both.

Figure 24:
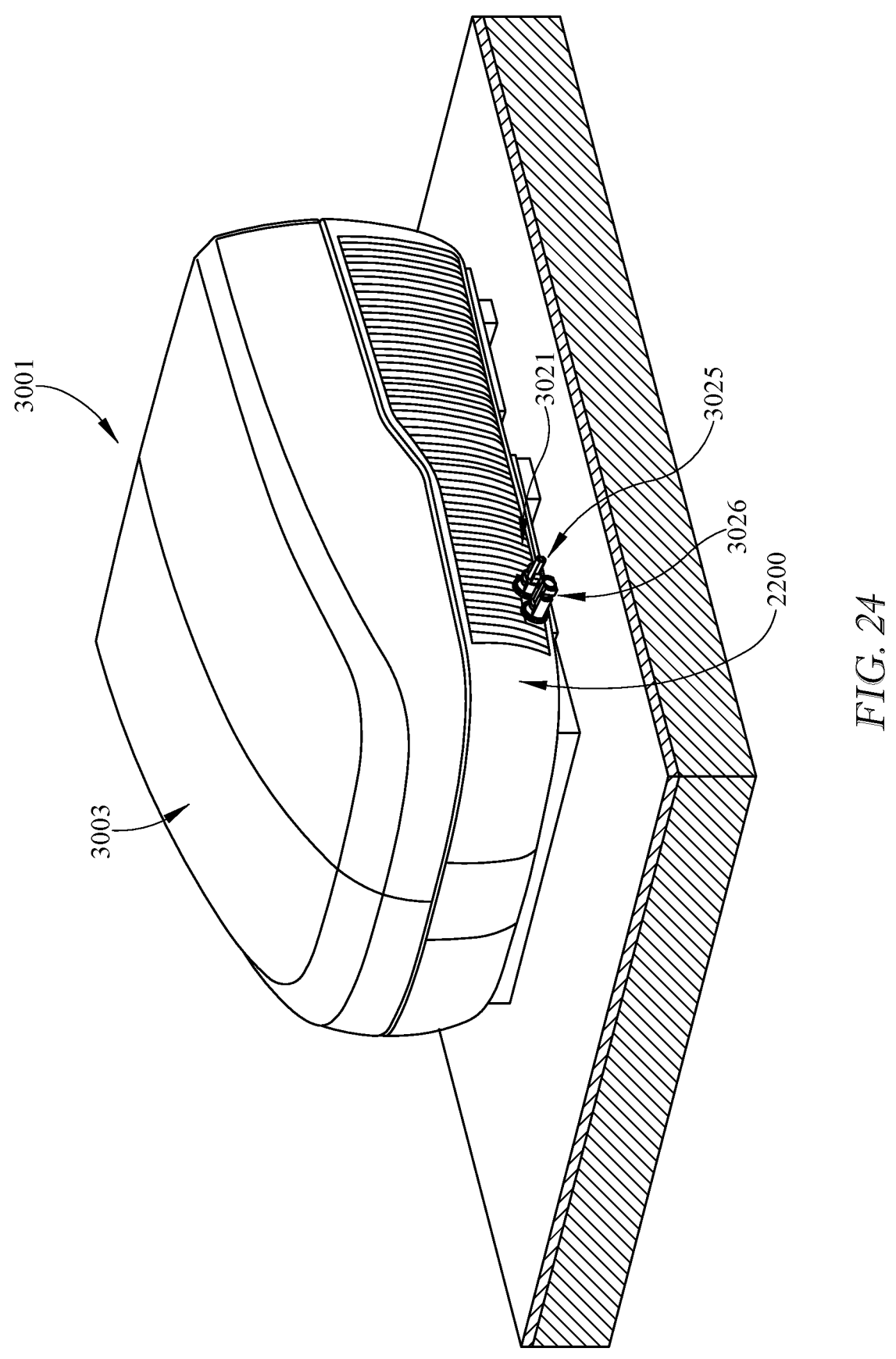

Referring now to FIG. 24, a perspective view of the air conditioning unit 3001. In this view, the shroud 3003 defines a frame 2200 and is shown mounted to the roof 100 of an RV. The frame is understood to include not only the interior surfaces and structures previously shown and described, but also exterior surfaces and structures. The exterior of the shroud 3003 may also define a frame and is shown with ports 3021 and connectors 3025, 3026 which allow for connection of wires that move from the exterior to the interior of the vehicle. In this embodiment, the connection ports may pass through the frame so that wires may extend from exterior to the interior or vice-versa. As shown in the example, the ports 3021 may be located in the ventilation slots of the shroud 3003. In an alternate construction, the wires may route through ventilation slots to interface with connectors mounted inside the appliance. Thus, the ventilation slots may function as ports for the wires to pass through, and engage with connectors on the interior.

REFERENCE NUMERALS

100 roof
101 outer roof surface
102 roof cut-out
103 ceiling
200 mounting frame
201 opening
202 outward facing side of the mounting frame
203 inward facing side of the mounting frame
204 first wall part
205 second wall part
206 upper component
207 lower component
208 screws (for assembling the mounting frame)
300 window
301 decorative window frame
302 handle
303 hinge pin
400 air conditioning unit or air conditioner
401 outer cover
402 abutting portion
403 cavity
404 gasket
405 fixing means at the air conditioning unit or air conditioner
406 first pipe section
407 base plate
408 recess
409 connection port
410 solar panel
411 solar panel connection port
412 socket DC
413 Inverter
414 socket AC
415 plug
416 antenna connection port
417 camera connection port
418 external light connection port
419 groove
420 air vents
421 base pan
422 opening in the base plate
500 air distribution unit
501 second pipe section
502 air deflecting elements
503 fixing means at the air distribution unit
504 air inlet
505 air outlet
506 filter cover
507 cable connection
508 air stream dividing portion
600 bore
601 screw
700 shading unit
701 blind
800 adapter
801 third pipe section
802 fourth pipe section
803 air stream divider
900 module
901 attachment portion
902 pressure sensor
903 light source

904 light sensor
905 smoke sensor
906 humidity sensor
907 temperature sensor
908 camera
909 motion sensor
910 microphone
911 vibration sensor
1001 fan
1003 housing
1005 fan plate
1006 Ceiling Opening
1007 aperture plate
1008 aperture plate
1009 interior trim assembly
1011 interior trim central opening
1013 interior fastener
1015 flange
1017 flange apertures
1018 web
1019 wires
1020 cutout framing material
1021 connection ports
1022 nut
1023 ribs
1025 male connector
1026 female connector
1027 hole
1200 mounting frame
1204 wall
2001 roof vent
2003 vent cover
2015 flange
2021 connection port
2025 connector
2026 connector
2200 frame
3001 ac unit
3003 shroud
3021 connector port
3025 connector
3026 connector

The invention claimed is:

1. A structure configured to move wire between an exterior and an interior, comprising:

a gasket configured to seal an outer surface of a recreational vehicle wherein the gasket is configured to enclose an opening in the outer surface through which at least one air flow path passes;

a frame configured to be placed on said gasket and on a surface of the recreational vehicle, said frame surrounding said opening in said outer surface of said recreational vehicle, said opening defining a flow path;

said frame comprising a flange and one or more outwardly extending walls extending from the flange;

an aperture plate extending from said outwardly extending wall comprising one or more ports;

said one or more ports disposed in the outwardly extending walls of the frame, said one or more ports defining a wire pathway through said frame, said wire pathway configured to extend between said exterior and said interior of said recreational vehicle; and, one or more connectors disposed in said one or more ports, respectively, said one or more connectors extending through said one or more ports of said aperture plate and into said one or more outwardly extending walls.

2. The structure of claim 1, said structure being part of a roof top air conditioner.

3. The structure of claim 2, said roof top air conditioner having a housing, with a plurality of cooling mechanicals therein, said housing defining said frame.

4. The structure of claim 3, said housing having a base and cover, with said plurality of cooling mechanicals therein, said base and cover defining said frame.

5. The structure of claim 4, further wherein said one or more ports are located on the housing of the roof top air conditioner.

6. The structure of claim 5, said one or more connectors extending from a ventilation slot.

7. The structure of claim 5, said one or more ports defined by ventilation slots.

8. The structure of claim 1, said structure being part of a ventilation assembly.

9. The structure of claim 8, said roof ventilation assembly having a vent cover disposed over said frame.

10. The structure of claim 1 said one or more connectors extending from said outwardly extending wall of said frame.

11. The structure of claim 1, said aperture plate having a thickness that is greater than said one or more outwardly extending walls.

12. The structure of claim 1, said one or more connectors being MC4 connectors.

13. The structure of claim 1, said aperture plate connected to said one or more outwardly extending walls defining a single structure.

14. The structure of claim 1, said structure being part of a window.

15. A system for providing electrical communication from exterior to interior of a vehicle, comprising:

an appliance configured to be positioned on said exterior of said vehicle;

a frame configured to be positioned exterior of said vehicle, said frame comprising a flange and one or more walls, said one or more walls comprise an aperture plate;

said frame capable of being positioned over an opening in an exterior surface of said vehicle;

one or more wires or cables extending between said appliance and said frame;

a port disposed in said aperture plate of said one or more walls of said frame and a connector located in said port, said connector providing a connection for said one or more wires or cables and one or more interior wires or cables; and, said one or more interior wires or cables extending to a location within said vehicle.

16. The system of claim 15, said appliance comprising a solar panel, external light, antenna, camera, inverter, or sensor.

17. The system of claim 15, said frame being a portion of a structure defining a ventilation fan, a refrigerator roof vent, or an air conditioner unit.

18. The system of claim 15, said aperture plate formed on said one or more walls.

19. The system of claim 15, said aperture plate connected to said one or more walls defining a single structure.

* * * * *